US012056326B2

(12) United States Patent
Chen et al.

(10) Patent No.: US 12,056,326 B2
(45) Date of Patent: Aug. 6, 2024

(54) DISPLAY APPARATUS

(71) Applicants: VIDAA USA, INC., Suwanee, GA (US); VIDAA (NETHERLANDS) INTERNATIONAL HOLDINGS B.V., RZ Duiven (NL)

(72) Inventors: Qi Chen, Shandong (CN); Gang Lei, Shandong (CN); Yuanyuan Huang, Shandong (CN); Yuqi Liu, Shandong (CN); Xiaojie Sun, Shandong (CN); Chen Sun, Shandong (CN); Hongwei Zhou, Shandong (CN); Peng Li, Shandong (CN); Yongjian Zhao, Shandong (CN)

(73) Assignees: VIDAA USA, INC., Suwanee, GA (US); VIDAA (NETHERLANDS) INTERNATIONAL HOLDINGS B.V., Rz Duiven (NL)

( * ) Notice: Subject to any disclaimer, the term of this patent is extended or adjusted under 35 U.S.C. 154(b) by 0 days.

(21) Appl. No.: 18/066,157

(22) Filed: Dec. 14, 2022

(65) Prior Publication Data
US 2023/0119195 A1    Apr. 20, 2023

Related U.S. Application Data

(63) Continuation of application No. PCT/US2021/051432, filed on Sep. 22, 2021.

(30) Foreign Application Priority Data

Sep. 22, 2020  (CN) .......................... 202011002291.X
Oct. 13, 2020  (CN) .......................... 202011090082.5
Nov. 11, 2020  (CN) .......................... 202011250562.3

(51) Int. Cl.
G06F 3/0481    (2022.01)
G06F 16/9032   (2019.01)
(Continued)

(52) U.S. Cl.
CPC ...... *G06F 3/0481* (2013.01); *G06F 16/90332* (2019.01); *H04N 21/4222* (2013.01); *H04N 21/4316* (2013.01)

(58) Field of Classification Search
None
See application file for complete search history.

(56) References Cited

U.S. PATENT DOCUMENTS 11,120,017 B1 *  9/2021  Lee .................... G06F 16/2428
11,461,003 B1 * 10/2022  Tse .................... G06F 3/04886
(Continued)

FOREIGN PATENT DOCUMENTS

CN    103500211 A    1/2014
CN    105069050 A   11/2015
(Continued)

OTHER PUBLICATIONS

International Search Report and Written Opinion, mailed Jan. 20, 2020, from PCT/US2021/051432.

*Primary Examiner* — Tuyetlien T Tran
(74) *Attorney, Agent, or Firm* — ANOVA LAW GROUP, PLLC

(57) ABSTRACT

The disclosure provides a display apparatus, and the display apparatus at least includes a display and a controller. At an initial state, the display presents a homepage; in response to a startup instruction, the display jumps to a search interface from the homepage; the search interface has a user interface, and the user interface is configured to receive a search content input from a user; in response to a search instruction, the controller reads the search content; and if the search content includes a phrase for locating, the controller controls an application corresponding to the phrase for locating to be started so as to transmit the search content to the application (Continued)

to cause the application to send a request carrying the search content to a server of the application.

20 Claims, 14 Drawing Sheets

(51) Int. Cl.
*H04N 21/422* (2011.01)
*H04N 21/431* (2011.01)

(56) References Cited

U.S. PATENT DOCUMENTS

| | | | | |
|---|---|---|---|---|
| 2006/0150215 | A1* | 7/2006 | Wroblewski | H04N 21/4312 725/47 |
| 2008/0086379 | A1* | 4/2008 | Dion | G06Q 30/0235 705/14.1 |
| 2009/0177989 | A1* | 7/2009 | Ma | H04N 21/4312 715/781 |
| 2009/0241061 | A1* | 9/2009 | Asai | G01C 21/3679 707/E17.108 |
| 2009/0259629 | A1* | 10/2009 | Wei | G06F 16/3338 |
| 2009/0287696 | A1* | 11/2009 | Galuten | G06F 16/438 707/999.005 |
| 2010/0306191 | A1* | 12/2010 | LeBeau | G06F 16/24578 707/723 |
| 2012/0124072 | A1* | 5/2012 | Vaidyanathan | G06F 16/9538 707/769 |
| 2012/0158531 | A1* | 6/2012 | Dion | G06F 3/165 705/26.1 |
| 2013/0174035 | A1* | 7/2013 | Grab | H04N 21/4316 715/716 |
| 2013/0205243 | A1* | 8/2013 | Rivera | G06Q 20/145 715/776 |
| 2015/0066913 | A1* | 3/2015 | Funk | H04N 21/8405 707/722 |
| 2015/0085191 | A1* | 3/2015 | Kim | H04N 5/04 348/518 |
| 2016/0134036 | A1* | 5/2016 | Huang | G06F 13/4086 439/70 |
| 2017/0046405 | A1* | 2/2017 | Liu | G06Q 30/0625 |
| 2019/0320235 | A1* | 10/2019 | Wang | H04N 21/4312 |
| 2020/0057774 | A1* | 2/2020 | Leong | G06F 16/60 |
| 2020/0127985 | A1* | 4/2020 | Isaacson | G07G 1/01 |
| 2020/0142513 | A1* | 5/2020 | Beaumier | G06F 16/632 |
| 2020/0236442 | A1* | 7/2020 | Dureau | G06F 16/48 |
| 2020/0311068 | A1* | 10/2020 | Hornkvist | G06F 16/248 |

FOREIGN PATENT DOCUMENTS

| | | |
|---|---|---|
| CN | 105095427 A | 11/2015 |
| CN | 105683966 A | 6/2016 |
| CN | 107291962 A | 10/2017 |
| CN | 108595642 A | 9/2018 |
| CN | 108874958 A | 11/2018 |
| CN | 110083737 A | 8/2019 |
| CN | 110263240 A | 9/2019 |
| CN | 110737840 A | 1/2020 |

* cited by examiner

DISPLAY APPARATUS

CROSS REFERENCE TO RELATED APPLICATIONS

This application is a continuation application of International Application No. PCT/US2021/051432, filed on Sep. 22, 2021, which claims priority to Chinese patent application No. 202011002291.X filed on Sep. 22, 2020, Chinese patent application No. 202011250562.3 filed on Nov. 11, 2020 and Chinese patent application No. 202011090082.5 filed on Oct. 13, 2020, the contents of which are hereby incorporated by reference in their entireties.

FIELD

The disclosure relates to a display apparatus.

BACKGROUND

With continuous development of the Internet technology, smart televisions have more and more functions, and in order to improve interaction experience of users, smart televisions on the market at present begin to support search functions. Contents of searching may include: menu option searching, content information searching, and media resource searching.

SUMMARY

The disclosure provides a display apparatus, including: a display; and a controller, configured to perform: controlling the display to present a search interface in response to a startup instruction, where the search interface has a user interface, and the user interface is configured to receive a search content input from a user; in response to a search instruction, reading the search content; if the search content includes a phrase for locating, starting an application corresponding to the phrase for locating; and transmitting the search content to the application to cause the application to send a request carrying the search content to a server of the application; and if the search content does not include a phrase for locating, sending a request carrying the search content to a homepage server.

The disclosure provides a display apparatus, including: a display, configured to display a search interface and a subentry interface, where the subentry interface has a display window and at least one label control, and a label control of the at least one label control is configured to load a label; and a controller, configured to perform: controlling the display to present the search interface in response to a startup instruction, where the search interface has a user interface, and the user interface is configured to receive a search content input from a user; in response to a search instruction, reading the search content; sending a request carrying the search content to a homepage server to cause the homepage server to issue a search result related to the search content; clustering the search result according to labels loaded by the subentry interface to obtain subentry results; and controlling the display to present corresponding subentry results in the display window in response to an operation on the label control from the user.

In some embodiments of the disclosure, the controller is further configured to: in response to an operation on an application label control from the user, start an application corresponding to the application label control; and transmit the search content to the application to cause the application to send a request carrying the search content to a server of the application.

The disclosure provides a display apparatus, including: a display, configured to display a user interface; a user interface, configured to receive an input signal; and a controller connected with the display and the user interface, configured to perform: determining all words input to a current setting item search box from a user; and searching all setting items corresponding to the words and displaying the setting items in a display bar below the setting item search box.

In some embodiments of the disclosure, a presentation mode of the setting items includes a jumping mode, a selecting mode and a converting mode.

In some embodiments of the disclosure, the controller is further configured to perform: receiving a first operation input from the user interface and indicating displaying of all sub-items corresponding to the setting items of the jumping mode; and displaying the sub-items on the display according to the first operation.

In some embodiments of the disclosure, the controller is further configured to perform: receiving a second operation input from the user interface and indicating adjustment of sub-items corresponding to the setting items of the selecting mode; and displaying another sub-item adjacent to a currently displayed sub-item on the display according to the second operation.

In some embodiments of the disclosure, the controller is further configured to perform:
receiving a third operation input from the user interface and indicating turning on or off of the setting items of the converting mode; and controlling the display to display a state corresponding to the setting items according to the third operation.

In some embodiments of the disclosure, prior to determining the words input to the current setting item search box from the user, the controller is further configured to perform: making a time interval between inputting or deleting words in the setting item search box the last time and inputting or deleting words in the setting item search box this time not smaller than a preset time interval.

In some embodiments of the disclosure, the controller is configured to perform displaying the setting items in the display bar below the setting item search box according to following steps: sorting all found setting items corresponding to the words; and displaying the sorted setting items in the display bar.

In some embodiments of the disclosure, the controller is configured to perform sorting all the found setting items corresponding to the words according to following steps: determining the latest using time of the setting items and the number of times of using the setting items in a history; and sorting all the found setting items corresponding to the words according to the latest using time and the number of times of using.

The disclosure further provides a method for searching setting items, including: determining all words input to a current setting item search box from a user; and searching all setting items corresponding to the words and displaying the setting items in a display bar below the setting item search box. Prior to determining the words input to the current setting item search box from the user, the method further includes: determining that a time interval between inputting or deleting words in the setting item search box the previous time and inputting or deleting words in the setting item search box this time is not smaller than a preset time interval.

The disclosure further provides a display apparatus, including: a display, configured to display media resource data; and a controller, configured to perform: recognizing keyword information in response to receiving the keyword information input to a search page from a user; and when the keyword information is recognized to include an application identifier, controlling a target search application to retrieve media resource data matching the keyword information and controlling the display to display the media resource data in a page of the target search application.

In some embodiments of the disclosure, the controller is configured to control the target search application to retrieve the media resource data according to a following method: controlling the display to display an application list popup window if the recognized keyword information includes a plurality of application identifiers, where the application list popup window includes a plurality of application identifiers, and each application identifier corresponds to a search application; and controlling a target search application corresponding to a target application identifier to retrieve the media resource data.

In some embodiments of the disclosure, the controller is further configured to perform: controlling the display to display the application list popup window if the keyword information is recognized to include a plurality of application identifiers, where the application list popup window includes a plurality of application identifiers and a first control; and in response to receiving an operation on the first control, controlling a built-in search application of the display apparatus to perform retrieving according to the keyword information to obtain a media resource set of a plurality of search applications, and controlling the display to display the media resource set in a page of the built-in search application.

In some embodiments of the disclosure, the controller is configured to control a target search application to retrieve the media resource data according to a following method: if the keyword information is recognized to include only one application identifier, controlling a target search application corresponding to the application identifier to retrieve the media resource data.

In some embodiments of the disclosure, the controller is further configured to perform: if the keyword information is recognized to include no application identifier, controlling the built-in search application of the display apparatus to perform retrieving according to the keyword information to obtain a media resource set of a plurality of search applications, and controlling the display to display the media resource set in the page of the built-in search application.

In some embodiments of the disclosure, the controller is configured to recognize the keyword information according to a following method: if a space character is recognized in the keyword information, utilizing the space character to divide the keyword information into a plurality of keywords; matching each keyword with an application identifier pool, where application identifiers of search applications installed in the display apparatus are stored in the application identifier pool; if the application identifier pool includes the keyword, determining that the keyword corresponds to the application identifier; and if the application identifier pool does not include the keyword, determining that the keyword belongs to a search term which is used to match the media resource data during retrieving.

DETAILED DESCRIPTION

In order to make the objectives, implementations and advantages of the disclosure clearer, implementations of the disclosure will be clearly and completely described below in combination with the attached drawings in embodiments of the disclosure. Apparently, the described embodiments are only part of embodiments of the disclosure, not all of them.

Based on embodiments described in the disclosure, all other embodiments obtained by those ordinarily skilled in the art without making creative effort belong to the scope of protection of the appended claims of the disclosure. In addition, although the contents disclosed in the disclosure are introduced according to one or more examples, it should be understood that various aspects of these disclosed contents may also constitute a complete implementation separately.

It should be noted that the brief description of terms in the disclosure is only for the convenience of understanding the implementations described below, rather than intended to limit the implementations of the disclosure. Unless otherwise indicated, these terms shall be understood in accordance with their common and usual meanings.

The terms "first", "second" and "third" in the description, claims and drawings in the disclosure are used to distinguish similar or same objects or entities, and do not necessarily mean to define a specific order or sequence, unless otherwise indicated. It should be understood that the terms so used may be interchanged under appropriate circumstances, for example, they may be implemented in a sequence other than those given in the illustration or description of embodiments of the disclosure.

The term "remote control" used in the disclosure refers to a component of an electronic device (such as a display apparatus disclosed in the disclosure), which may generally control the electronic device wirelessly within a short distance. Generally, infrared and/or radio frequency (RF) signals and/or Bluetooth are used to connect with the electronic device. The electronic device may also include a WiFi module, a wireless USB module, a Bluetooth module, a motion sensor and other functional modules. For example, a handheld touch remote control replaces most of physical built-in hard keys in a general remote control apparatus with a user interface in a touch screen.

Figure 1:
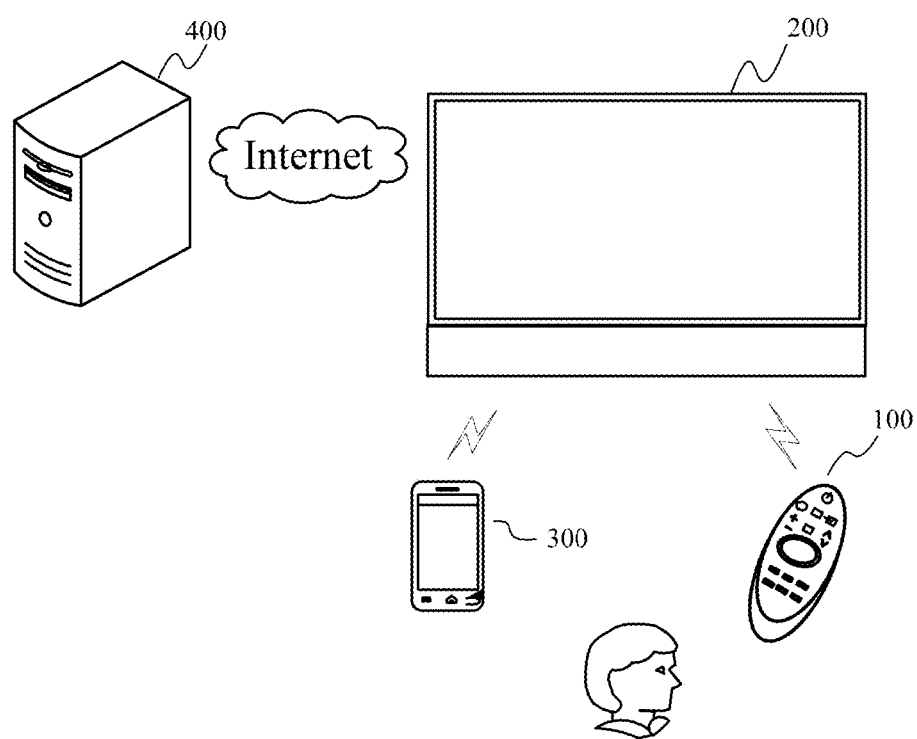
FIG. 1 shows a schematic diagram of an operation scenario between a display apparatus and a control apparatus.

FIG. 1 provides a schematic diagram of an operation scenario between a display apparatus and a control apparatus according to an embodiment. As provided in FIG. 1, a user may operate the display apparatus 200 through a mobile terminal 300 and the control apparatus 100.

In some embodiments, the control apparatus 100 may be a remote control, communication between the remote control and the display apparatus includes infrared protocol communication or Bluetooth protocol communication and other short-distance communication modes, and the display apparatus 200 is controlled in wireless or other wired modes. The user may control the display apparatus 200 by inputting a user instruction through keys on the remote control, voice input, control panel input or the like. For example: the user may realize the function of controlling the display apparatus 200 by inputting corresponding control instructions through a volume up/down key, a channel control, an up/down/left/right moving key, a voice input key, a menu key, an on/off key or the like on the remote control.

In some embodiments, the display apparatus 200 may also be controlled by using a mobile terminal, a tablet computer, a computer, a notebook computer and other intelligent devices. For example, an application running on the intelligent device is used to control the display apparatus 200. Through configuration, the application may provide various controls for the user on a screen associated with the intelligent device through an intuitive user interface (UI).

In some embodiments, software applications may be installed on both the mobile terminal 300 and the display apparatus 200 to realize connection and communication through a network communication protocol, and further achieve the purposes of one-to-one control operations and data communication. For example: a control instruction protocol may be established between the mobile terminal 300 and the display apparatus 200 to synchronize a remote-control control panel to the mobile terminal 300, and the function of controlling the display apparatus 200 is realized by controlling a user interface on the mobile terminal 300. Audio and video contents displayed on the mobile terminal 300 may also be transmitted to the display apparatus 200 to realize a synchronous display function.

As further provided in FIG. 1, the display apparatus 200 further performs data communication with a server 400 through a plurality of communication modes. The display apparatus 200 may be allowed to perform communication connection through a local area network (LAN), a wireless local area network (WLAN) or other networks. The server 400 may provide various contents and interactions for the display apparatus 200.

The display apparatus 200 may be a liquid crystal display, an OLED display or a projection display apparatus. Besides providing a television function of broadcast receiving, the display apparatus 200 may further additionally provide a smart network television function of a computer supporting function.

Figure 2:
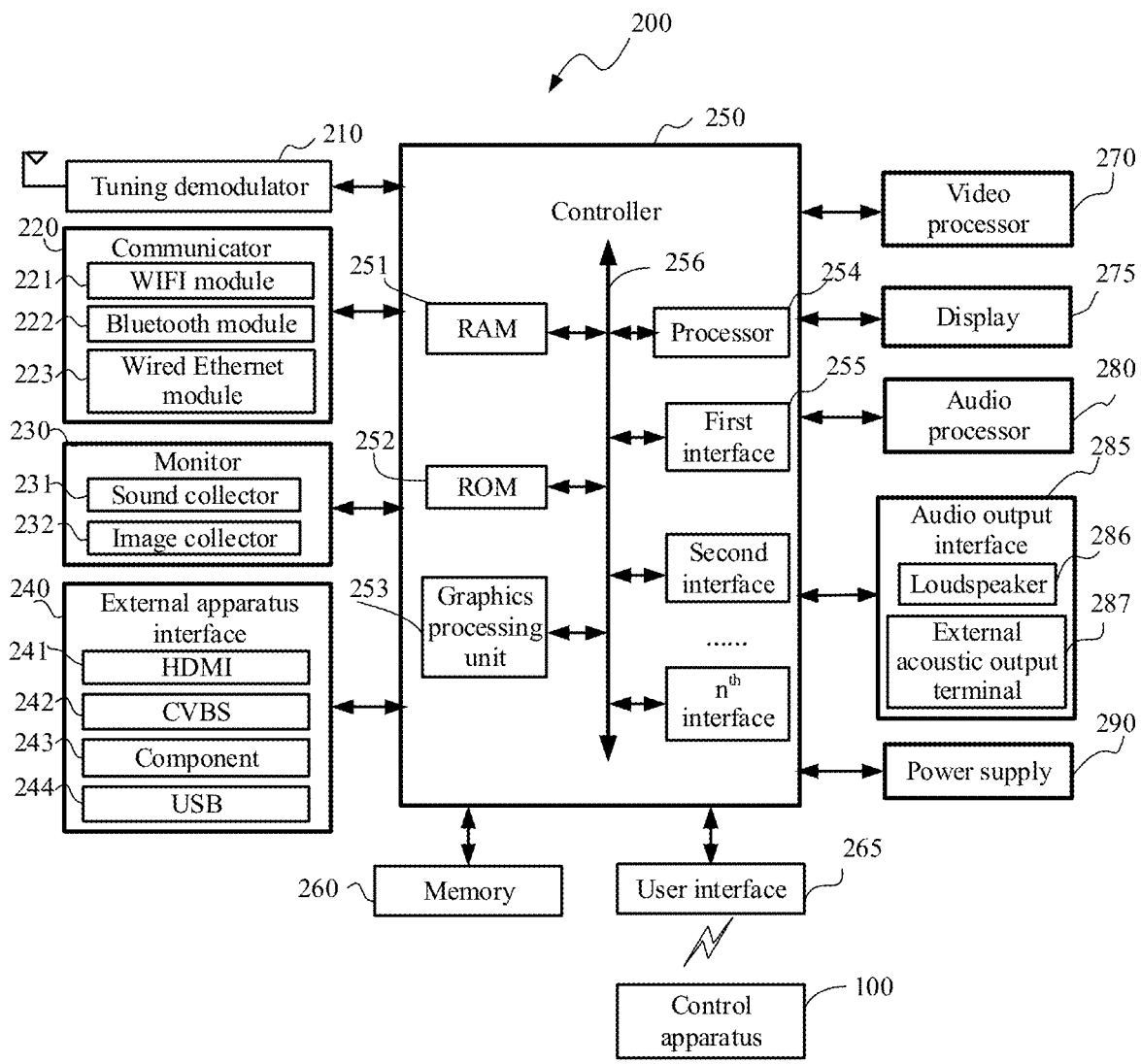
FIG. 2 shows a block diagram of hardware configuration of a display apparatus 200.

FIG. 2 shows a block diagram of hardware configuration of the display apparatus 200 according to an embodiment of the disclosure.

In some embodiments, the display apparatus 200 includes at least one of a controller 250, a tuning demodulator 210, a communicator 220, a monitor 230, an input/output interface 255, a display 275, an audio output interface 285, a memory 260, a power supply 290, a user interface 265 or an external apparatus interface 240.

In some embodiments, the display 275 is a component configured to receive an image signal output from a first processor and display a video content, images and a menu control interface.

In some embodiments, the display 275 includes a display screen component for presenting an image and a driving component for driving image displaying.

In some embodiments, the display 275 is configured to present a user control UI which is produced in the display apparatus 200 and configured to control the display apparatus 200.

In some embodiments, according to different types, the display 275 further includes a driving component configured to drive displaying.

In some embodiments, the display 275 is a projection display and may further include a projection apparatus and a projection screen.

In some embodiments, the communicator 220 is a component configured to communicate with an external device or an external server according to various communication protocol types. For example: the communicator may include at least one of a Wifi chip, a Bluetooth communication protocol chip, a wired Ethernet communication protocol chip and other network communication protocol chips or near-field communication protocol chip or an infrared receiver.

In some embodiments, the display apparatus 200 may send and receive a control signal and a data signal to and from the external control apparatus 100 or a content providing device through the communicator 220.

In some embodiments, the user interface 265 may be configured to receive an infrared control signal of the control apparatus 100 (e.g. an infrared remote control).

In some embodiments, the monitor 230 is configured to collect signals of an external environment or signals interacted with the outside for the display apparatus 200.

In some embodiments, the monitor 230 includes an optic receiver and a sensor configured to collect an ambient light intensity, and the monitor 230 may adaptively display parameter change and the like by collecting ambient light.

In some embodiments, the monitor 230 may further include an image collector such as a camera and a webcam, which may be configured to collect an external environment scenario and collect user's attributes or interact gestures with a user so as to adaptively change display parameters and may also recognize user's gestures to realize the function of interaction with the user.

In some embodiments, the monitor 230 may further include a temperature sensor or the like to, for example, sense an environment temperature.

In some embodiments, the display apparatus 200 may adaptively adjust a display color temperature of an image. For example, when the environment temperature is high, the color temperature of the image displayed by the display apparatus 200 may be adjusted to a relatively cold tune, or when the environment temperature is low, the color temperature of the image displayed by the display apparatus 200 may be adjusted to a relatively warm tune.

In some embodiments, the monitor 230 may further include a sound collector, such as a microphone, which may be configured to receive sound of a user. For example, the sound includes a voice signal of a control instruction used by the user to control the display apparatus 200, or the sound collector may collect environment sound for recognizing environment scenario types, so that the display apparatus 200 may be adaptive to environmental noise.

In some embodiments, as shown in FIG. 2, the input/output interface 255 is configured to perform data communication between the controller 250 and other external devices or other controllers 250. For example, the input/output interface may receive video signal data and audio signal data or command and instruction data or the like from the external devices.

In some embodiments, the external apparatus interface 240 may include but is not limited to: any one or more of a high definition multimedia interface (HDMI), an analog or digital high definition component input interface, a composite video input interface, a USB input interface, an RGB port and the like. The external apparatus interface may also be a composite input/output interface formed by a plurality of interfaces above.

In some embodiments, as shown in FIG. 2, the tuning demodulator 210 is configured to receive a broadcast television signal in a wired or wireless receiving mode, and may perform modulation-demodulation processing such as amplification, frequency mixing and resonance.

In some embodiments, the tuning demodulator 210 is controlled by the controller 250 to perform demodulation, and the controller 250 may send a control signal according to user's selection to cause the tuning demodulator to respond to a television signal frequency selected by the user and modulate and demodulate a television signal carried by the frequency.

In some embodiments, the controller 250 and the tuning demodulator 210 may be located in different split devices, that is, the tuning demodulator 210 may be located in an external device of a main device where the controller 250 is located, such as an external set top box.

In some embodiments, the controller 250 controls the display apparatus to work and responds to user's operations through various software control programs stored on the memory. The controller 250 may control an overall operation of the display apparatus 200. For example, in response to receiving a user command configured to select UI objects displayed on the display 275, the controller 250 may perform operations related to an object selected by the user command.

As shown in FIG. 2, the controller 250 includes at least one of a random access memory (RAM) 251, a read-only memory (ROM) 252, a video processor 270, an audio processor 280, other processors 253 (such as: a graphics processing unit (GPU), a central processing unit (CPU) 254 and a communication interface) or a communication bus 256. These components are connected through the communication bus.

In some embodiments, the RAM 251 is configured to store temporary data of an operating system or other running programs.

In some embodiments, the ROM 252 is configured to store various system startup instructions.

In some embodiments, the ROM 252 is configured to store a basic input output system (BIOS).

In some embodiments, the CPU 254 is configured to perform an operating system and application instructions stored in the memory and perform various applications, data and contents according to various received interaction instructions input externally, so as to finally display and play various audio and video contents.

In some embodiments, the CPU 254 may include a plurality of processors.

In some embodiments, the graphics processing unit 253 is configured to generate various graphic objects, such as: an icon, an operating menu, and user input instruction display graphics. In some embodiments, the video processor 270 is configured to perform video processing on a received external video signal according to a standard encoding and decoding protocol of input signals, to obtain signals which may be directly displayed or played on the display apparatus 200.

In some embodiments, the video processor 270 includes a demultiplexing module, a video decoding module, an image synthesizing module, a frame rate converting module, a display formatting module and the like.

In some embodiments, the graphics processing unit 253 and the video processor may be integrated or separated.

In some embodiments, the audio processor 280 is configured to perform processing such as decompression and decoding on a received external audio signal according to the standard encoding and decoding protocol of input signals, to obtain sound signals which may be played in the loudspeaker.

In some embodiments, the video processor 270 may include one or more chips. The audio processor may also include one or more chips.

In some embodiments, the video processor 270 and the audio processor 280 may be independent chips or may be integrated into one or more chips with the controller.

In some embodiments, audio output may include receiving the sound signals output by the audio processor 280 under the control of the controller 250. For example: the loudspeaker 286 and loudspeakers other than the loudspeaker in the display apparatus 200 may output signals to an external acoustic output terminal of a sounding apparatus of an external device. For example: an external acoustic interface or an earphone interface may further output signals to a near field communication module in a communication interface, such as: a Bluetooth module for sound output of a Bluetooth loudspeaker.

The power supply 290 is configured to provide electric power input from an external power source for the display apparatus 200 as power supply support under control of the controller 250. The power supply 290 may include a built-in power supply circuit installed in the display apparatus 200, or a power source installed outside the display apparatus 200, and the display apparatus 200 provides a power interface for the external power source.

The user interface 265 is configured to receive an input signal of a user and then send the received user input signal to the controller 250. The user input signal may be a remote control signal received through an infrared receiver, and various user control signals may be received through a network communication module.

In some embodiments, the user inputs a user command through the control apparatus 100 or the mobile terminal 300, the user input interface receives user input, and the display apparatus 200 responds to the user input through the controller 250.

In some embodiments, the user may input a user command on a graphics user interface (GUI) displayed on the displayer 275, and the user input port receives the user input command through the GUI. Alternatively, the user may input a user command by inputting specific sound or gestures, and the user input interface recognizes the sound or gestures through a sensor to receive the user input command.

The memory 260 stores various software modules configured to drive the display apparatus 200. For example: various software modules stored in a first memory includes at least one of: a basic module, a monitoring module, a communication module, a display control module, a browser module or various service modules.

For example, a voice recognition module includes a voice parsing module and a channel changing instruction database module. The display control module is a module configured to control the display to display image contents and may be configured to play multimedia image contents, a UI and such information. The communication module is a module configured to perform control and data communication with an external device. The browser module is a module configured to perform data communication between browsing servers. The service modules are modules configured to provide various services and various applications. Meanwhile, the memory 260 is further configured to store received external data and user data, images of various items in various user interfaces, a visual effect picture of a focus object or the like.

Figure 3:
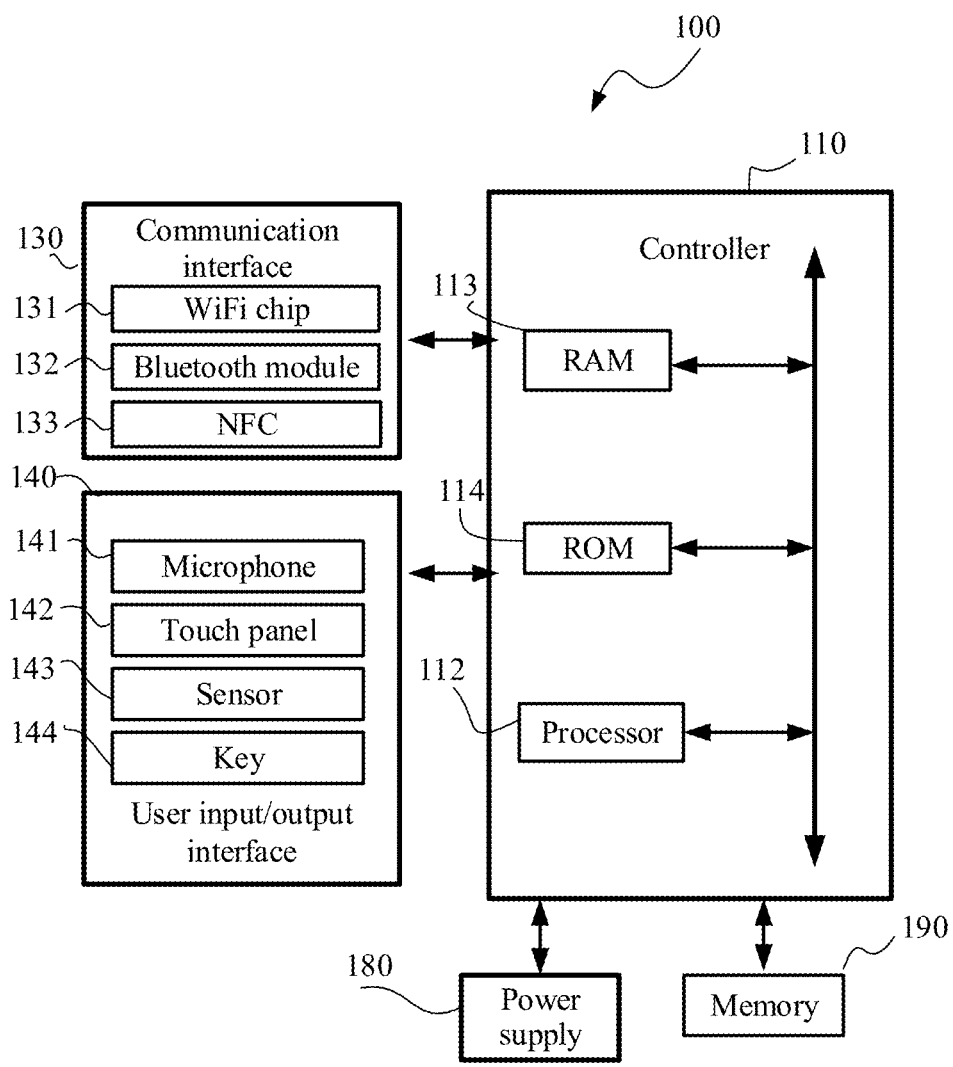
FIG. 3 shows a block diagram of hardware configuration of a control apparatus 100.

FIG. 3 provides a block diagram of configuration of the control apparatus 100 according to an embodiment. As shown in FIG. 3, the control apparatus 100 includes a controller 110, a communication interface 130, a user input/output interface, a memory and a power supply.

The control apparatus 100 is configured to control the display apparatus 200, may receive an operation instruction input from a user and convert the operation instruction into an instruction capable of being recognized and responded by the display apparatus 200, and plays an interaction intermediary role between the user and the display apparatus 200. For example, the user operates a channel up/down key on the control apparatus 100 to cause the display apparatus 200 to respond to a channel up/down operation.

In some embodiments, the control apparatus 100 may be an intelligent device. For example: various applications for controlling the display apparatus 200 may be installed in the control apparatus 100 according to user's requirements.

In some embodiments, as shown in FIG. 1, the mobile terminal 300 or other intelligent electronic devices may have the function similar to the control apparatus 100 after an application for controlling the display apparatus 200 is installed. For example, by installing an application, a user may use various function keys or virtual buttons on a graphics user interface provided by the mobile terminal 300 or other intelligent electronic devices to achieve the function of solid keys on the control apparatus 100.

The controller 110 includes a processor 112, a RAM 113, a ROM 114, a communication interface 130 and a communication bus. The controller is configured to control running and operations of the control apparatus 100, communication cooperation between all internal units, and external and internal data processing functions.

Under control of the controller 110, the communication interface 130 realizes communication of a control signal and a data signal with the display apparatus 200. For example: a received user input signal is sent to the display apparatus 200. The communication interface 130 may include at least one of a WiFi chip 131, a Bluetooth module 132, an NFC module 133 or other near-field communication modules.

In the user input/output interface 140, an input interface includes at least one of a microphone 141, a touch panel 142, a sensor 143, a key 144 or other input interfaces. For example, a user may achieve a user instruction input function through actions such as voice, touch, a gesture and pressing, and the input interface converts a received analog signal into a digital signal and converts the digital signal into a corresponding instruction signal and then sends the signal to the display apparatus 200.

An output interface includes an interface for sending a received user instruction to the display apparatus 200. In some embodiments, the output interface may be an infrared interface or a radio frequency interface. For example, when the output interface is the infrared signal interface, a user input instruction needs to be converted into an infrared control signal according to an infrared control protocol and then the infrared control signal is sent to the display apparatus 200 through an infrared sending module. For another example, when the output interface is the radio frequency signal interface, a user input instruction needs to be converted into a digital signal, and after being modulated according to a radio frequency control signal modulation protocol, the digital signal is sent to the display apparatus 200 via a radio frequency sending terminal.

In some embodiments, the control apparatus 100 includes at least one of a communication interface 130 or an input/output interface 140. The communication interface 130 configured in the control apparatus 100, such as: a WiFi module, a Bluetooth module, an NFC module or other modules, may send a user input instruction to the display apparatus 200 after encoding the instruction through a WiFi protocol, a Bluetooth protocol or an NFC protocol.

The memory 190 is configured to store various running programs, data and applications for driving and controlling the control apparatus 100 under the control of the controller. The memory 190 may store various control signal instructions input from a user.

The power supply 180 is configured to provide running power support for all elements of the control apparatus 100 under the control of the controller, and may be a battery and a relevant control circuit.

Figure 4:
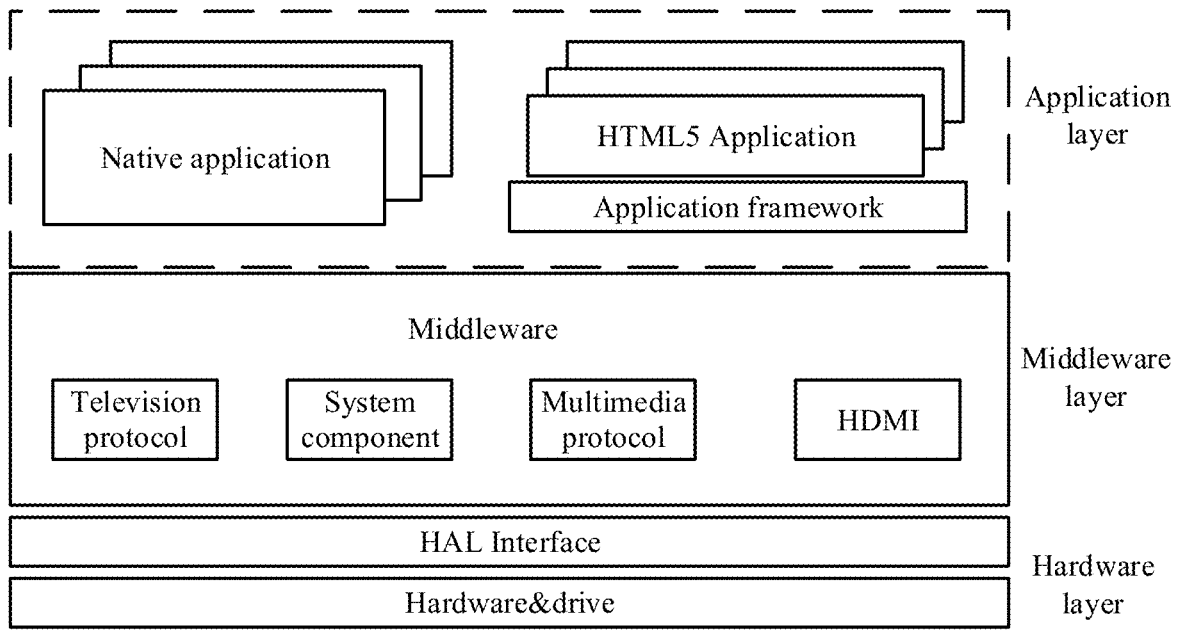
FIG. 4 shows a schematic diagram of software configuration in a display apparatus 200.

As shown in FIG. 4, a system of the display apparatus is divided into three layers which are an application layer, a middleware layer and a hardware layer from top to bottom respectively.

Figure 5:
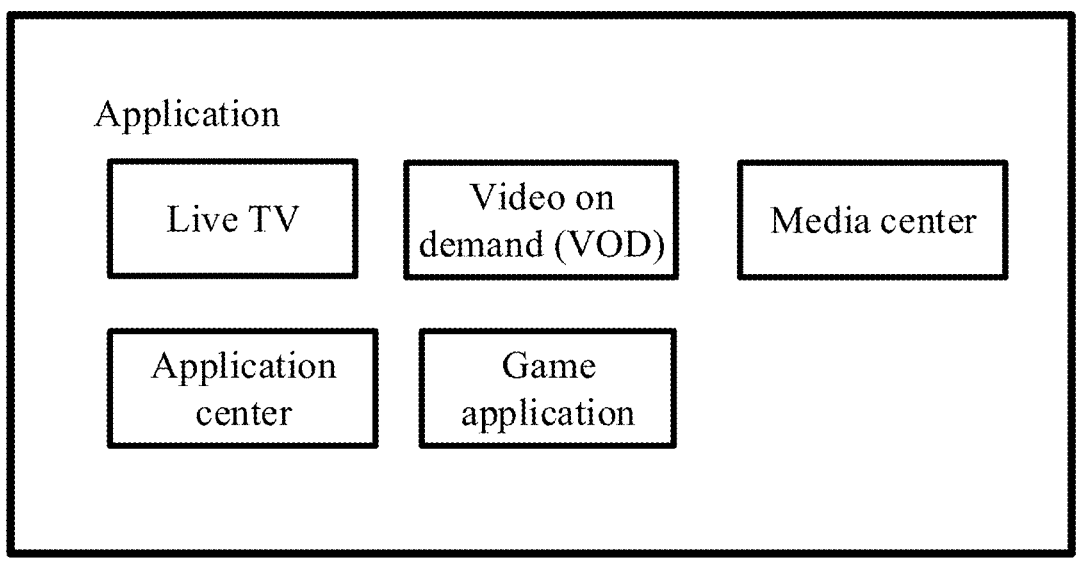
FIG. 5 shows a schematic diagram of displaying of an icon control interface of an application in a display apparatus 200.

In some embodiments, as shown in FIG. 5, the application layer includes at least one application, and corresponding icon controls may be displayed in the display 275, such as a live TV application icon control, a video on demand application icon control, a media center application icon control, an application center icon control and a game application icon control.

First aspect is described as follows.

A search process of the display apparatus is: a home page of the display apparatus is configured with a search box and a search control. A user inputs a search content to be searched in the search box. In response to an operation on the search control, the display apparatus may send a request carrying the search content to a server to cause the server to issue search results related to the search content to the display apparatus, and the display apparatus displays the received search results. The results found in the above search process are disordered and complex, the search results may include information such as voice, a video and a web page, and the user may hardly orient a needed search result from the numerous search results quickly.

Figure 6:
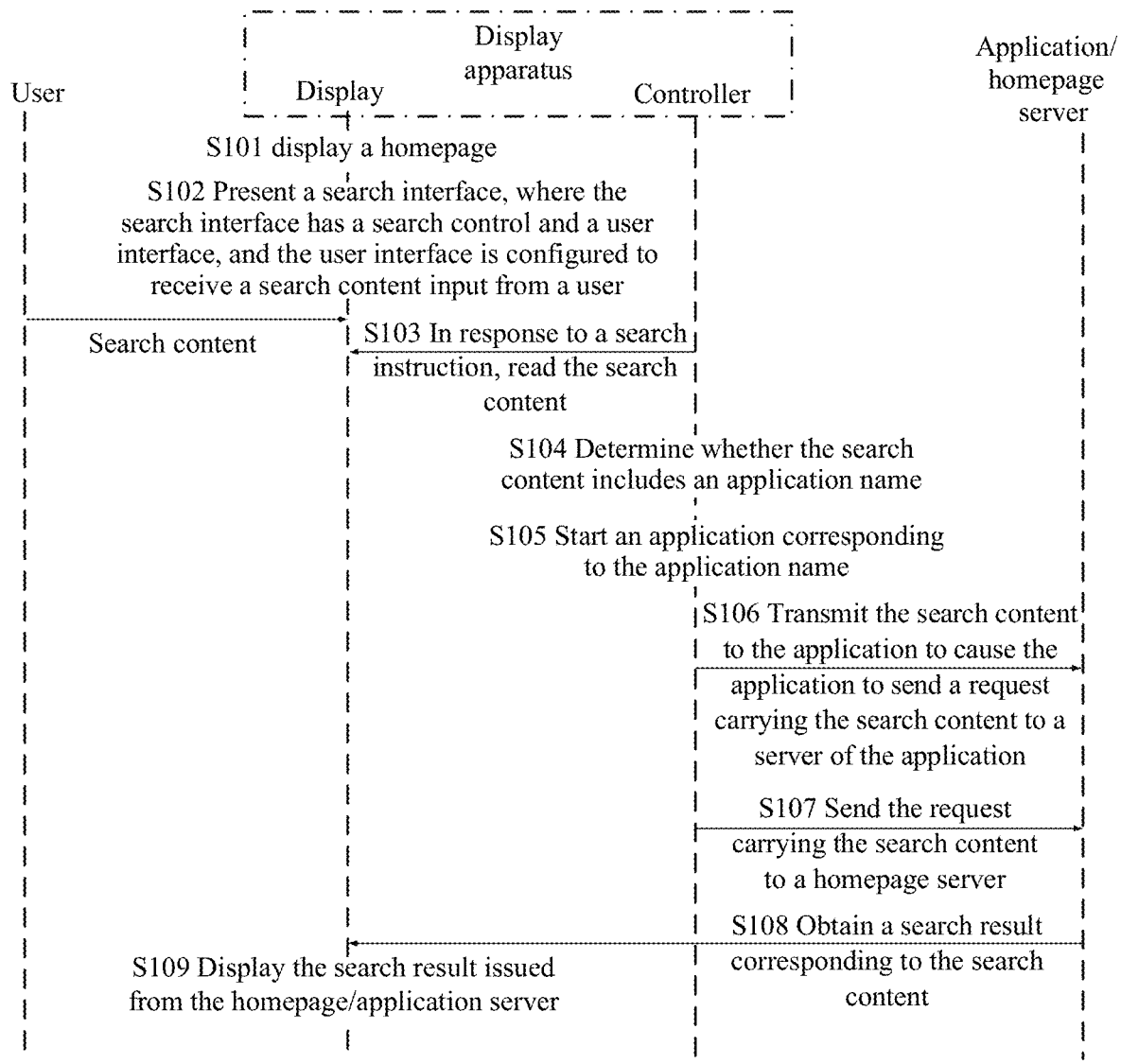
FIG. 6 is a flow chart of an interaction of a display apparatus, a user and a server according to an embodiment of the disclosure.

Considering the above problems, a first aspect of an embodiment of the disclosure shows a display apparatus. The display apparatus includes a display, a user interface and a controller. An interaction process of the display apparatus, a user and a server may refer to FIG. 6, and FIG. 6 is a flow chart of an interaction of the display apparatus, the user and the server according to an embodiment of the disclosure.

At an initial state, the display performs step S101 of displaying a homepage.

Figure 7:
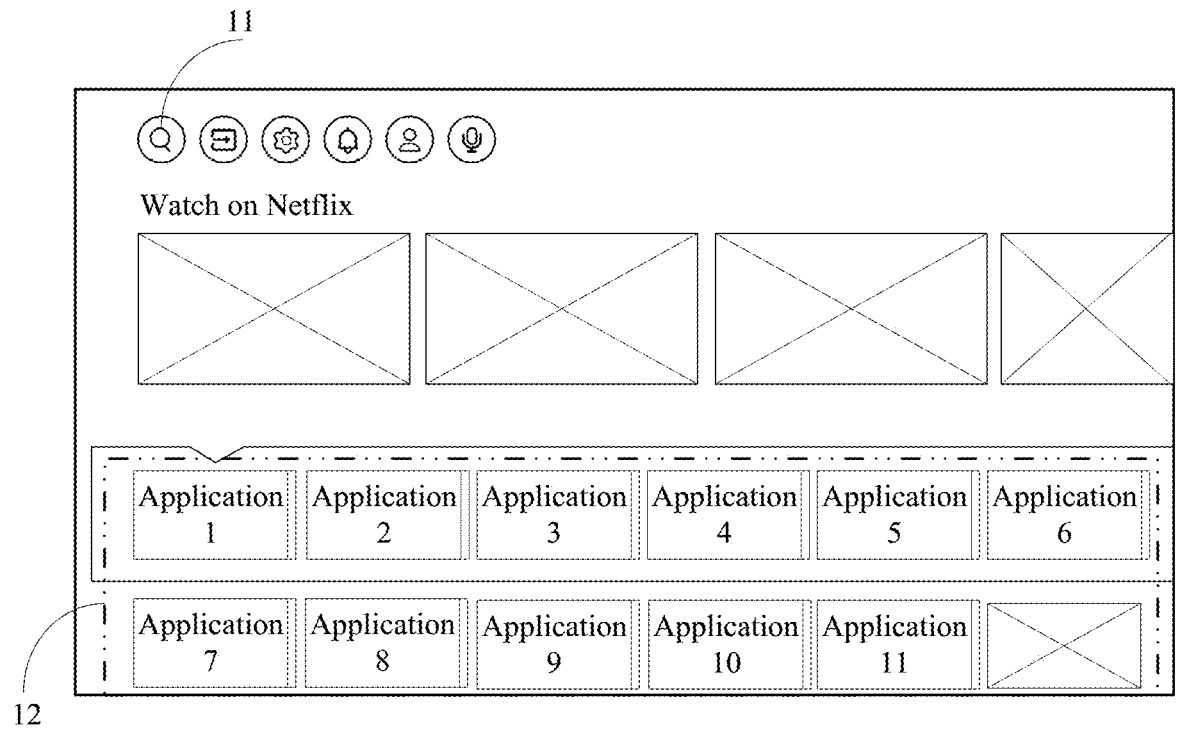
FIG. 7 is a schematic diagram of a homepage according to an embodiment of the disclosure.

Referring to FIG. 7, FIG. 7 is a schematic diagram of the homepage shown according to an embodiment of the disclosure.

To play a prompt role, in some embodiments, the homepage has a presentation region 12, and the presentation region is configured to present icons and/or application names of applications installed in the display apparatus. The user may know which applications are installed in the display apparatus through contents presented in the presentation region 12, thus inputting a search content in a targeted mode.

In response to a startup instruction, the display performs step S102 of presenting a search interface.

There are many ways to generate the startup instruction.

For example, the display apparatus according to an embodiment of the disclosure may have a voice assistant, and the voice assistant may convert user's voice into a corresponding control instruction. The control instruction is the startup instruction. In response to the startup instruction, a page presented by the display is changed from the homepage to the search interface. For instance, the user may output a wakeup word in advance and then outputs the control instruction, and the user has a connection with the controller based on the wakeup word to cause the controller to correspondingly respond to the startup instruction output from the user. In some embodiments, the user inputs "Xiaojutongxue" and "entering search interface", the voice assistant converts the voice input from the user into the control instruction, and responding to the control instruction, the page presented by the display is changed from the homepage to the search interface.

For another example, the user may send the startup instruction through a remote control. A sending process of the startup instruction may be: the user touches related keys of the remote control to cause the controller to send the startup instruction, so that the homepage on the display is changed to the search interface. In some embodiments, the user may click a "#" key of the remote control to control the page presented by the display to change from the homepage to the search interface.

For another example, in some embodiments, a generation mode of the startup instruction may be: the user controls a focus to move through "up", "down", "left" and "right" keys of the remote control, when the focus moves to the search control and the user clicks an "OK" key, the startup instruction is generated, and at the moment, the page presented by the display is changed from the homepage to the search interface.

This embodiment merely shows several generation modes of the startup instruction, and in the actual application process, the generation mode of the startup instruction may be but not limited to the several modes above.

Figure 8:
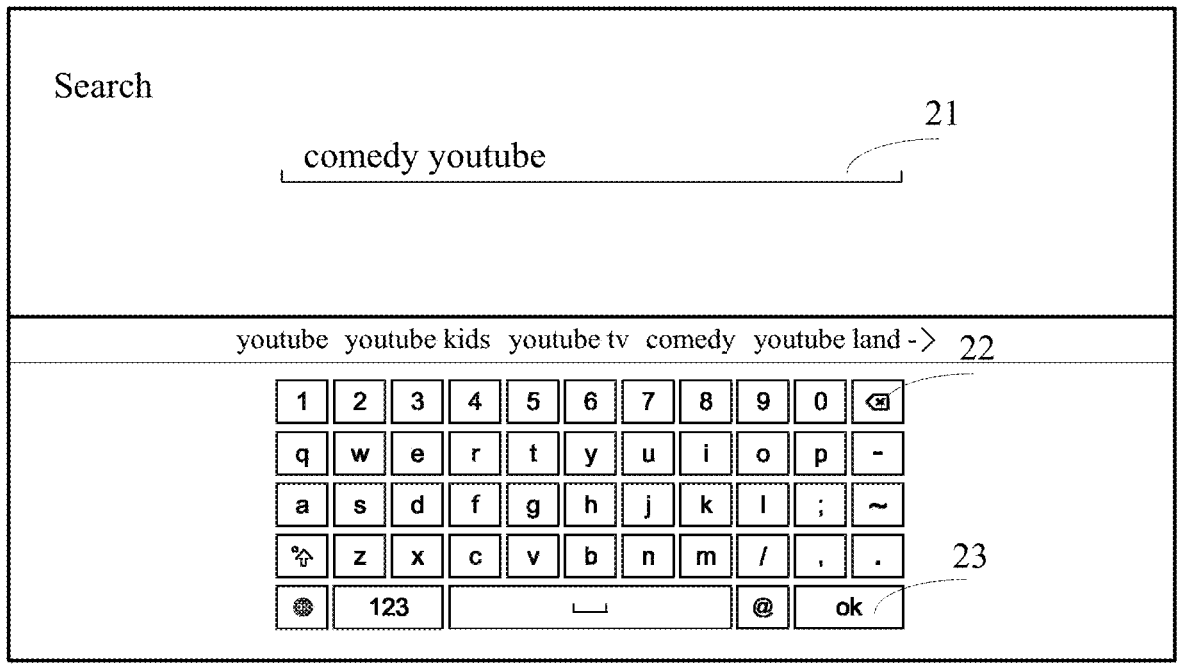
FIG. 8 is a schematic diagram of a search interface according to an embodiment of the disclosure.

In some embodiments, the search interface may have a user interface, and the user interface is configured to receive a search content input from the user. FIG. 8 is a schematic diagram of the search interface according to an embodiment of the disclosure. It may be seen that the search interface has the user interface 21, and the user may input the search content through the user interface.

The way that the user inputs the search content may be: the user outputs a wakeup word in advance and then outputs the search content. The user has a connection with the controller based on the wakeup word to cause the controller to receive the search content. In some embodiments, the user inputs "Xiaojutongxue" and "playing comedy", where "playing comedy" is the search content.

The way that the user inputs the search content may be: continuing to refer to FIG. 8, the search interface may have a soft keyboard 22, and the user may input the search content in a way of controlling a focus to move through the remote control.

This embodiment merely shows several input ways of the search content, and in the actual application process, the input ways of the search content may be but not limited to the several ways above.

In some embodiments, the search content at least includes a phrase for search. In some embodiments, the search content may include the phrase for search and a phrase for locating.

For instance, in some embodiments, the search content input from the user may be "comedy", where "comedy" is the phrase for search. In other embodiments, the search content input from the user may be "comedy YOUTUBE", where "comedy" is the phrase for search, and "YOUTUBE" is the phrase for locating.

In response to a search instruction, the controller performs step S103 of reading the search content.

The generation mode of the search instruction may refer to the startup instruction above, which is not repeated here.

In some embodiments, the soft keyboard 22 of the search interface has a confirmation control 23, and in response to an operation on the confirmation control 23 from the user, the controller may be triggered to read the search content.

In some embodiments, a confirmation control (not shown in the figures) is set at a tail end of the user interface, and in response to an operation on the confirmation control from the user, the controller may be triggered to read the search content.

The controller performs step S104 of determining whether the search content includes the phrase for locating.

There are many implementations for determining whether the search content includes the phrase for locating.

For example, in some embodiments, an application list is stored in the controller in advance. The application list is configured to record relevant information of applications installed in the display apparatus, and the relevant information may include application names. The controller traverses the application list stored in advance, and if the application list includes an application name matching the search content, an application corresponding to the application name is started.

For instance, in some embodiments, the user inputs a query content "comedy YOUTUBE", and the controller traverses Table 1 to determine that "YOUTUBE" is recorded in Table 1. In some embodiments, the user inputs a query content "comedy IQIYI", and the controller traverses Table 1 to determine that "IQIYI" is not recorded in Table 1.

TABLE 1

| No. | Application name | Note |
| --- | --- | --- |
| 1 | YOUTUBE | — |
| 2 | Wechat | — |
| 3 | Youku | — |
| 4 | Amazon | — |
| ... | ... | ... |

For another example, in some embodiments, the controller may calculate similarities between the search content and the application names recorded in the application list, a maximum similarity is selected, and an application corresponding to an application name with the maximum similarity is started if the maximum similarity is greater than a preset similarity. The preset similarity may be set as needed. The preset similarity may be 60%.

For instance, in some embodiments, the user inputs a query content "comedy YOUTUBE", the controller traverses Table 1 and calculates similarities between "comedy YOUTUBE" and various application names, and the application name "YOUTUBE" has the maximum similarity which is 85% (greater than the preset similarity), thus the controller starts the application YOUTUBE.

In some embodiments, the user mistakenly writes locating information as "YETOBE", the controller traverses Table 1 and calculates similarities between "comedy YETOBE" and various application names, and the application name "YOUTUBE" has the maximum similarity which is 65% (greater than the preset similarity), thus the controller starts the application YOUTUBE.

In some embodiments, the user inputs a query content "comedy IQIYI", the controller traverses Table 1 and calculates similarities between "comedy IQIYI" and various application names, and the application name "YOUTUBE" has the maximum similarity which is 5% (smaller than the preset similarity), thus the controller does not start the application YOUTUBE.

For another example, to improve the user experience, in some embodiments, short names of the applications may be recorded in the application list, correspondingly, when the user inputs the search content, an input phrase for locating may be a short name of an application, and therefore the quantity of words input from the user may be reduced, thereby improving the user experience.

Table 2 is an application list shown according to some feasible embodiments.

TABLE 2

| No. | Application name | Short name | Note |
| --- | --- | --- | --- |
| 1 | YOUTUBE | YTB | — |
| 2 | Wechat | WX | — |
| 3 | Youku | YK | — |
| 4 | Amazon | YMX | — |
| ... | ... | ... | ... |

It should be noted that the disclosure merely shows some short names, and in the actual application process, the user may configure the short names according to own habits. For example, a short name of "YOUTUBE" may be "Y", a short name of "Wechat" may be "W", and so on, which is not limited here.

The disclosure merely shows several implementations for determining whether the search content includes the phrase for locating, and in the actual application process, an implementation for determining whether the search content includes the phrase for locating may be but not limited to the several modes above.

In order to reduce the calculated amount of the controller, in some embodiments, a format of the search content may be set, for example, the format of the search content may be "phrase for search*phrase for locating". When the search content is read by the controller, "*" may be located, and the content behind "*" is compared with a content recorded in the application list to finally determine whether the search content includes the phrase for locating. The determining process may refer to embodiments above, which is not repeated here.

If the search content includes application information, the controller performs step S105 of starting an application corresponding to the application information.

The controller performs step S106 of transmitting the search content to the application to cause the application to send a request carrying the search content to a server of the application.

If the search content does not include application information, the controller performs step S107 of sending a request carrying the search content to a homepage server.

The homepage/application server performs step S108 of obtaining a search result corresponding to the search content.

The display performs step S109 of displaying the search result issued from the homepage/application server.

Two servers are involved in this embodiment, namely the homepage server and the server of the application.

The homepage server is configured to obtain the search result corresponding to the search content, and the search result may include: a video related to the search content, an audio related to the search content, a picture related to the search content, a website related to the search content, a forum related to the search content and the like. For instance, in some embodiments, the search content received by the homepage server is "comedy", so the search result issued from the homepage server may include: a video related to a comedy, an audio related to a comedy, a picture related to a comedy, a website related to a comedy, a forum related to a comedy and the like.

The server of the application is configured to obtain the search result corresponding to the search content, and a content of the search result relies on a function of the application. For example, YOUTUBE is a short video application, so a search result obtained by a corresponding server of YOUTUBE is a short video. For instance, in some embodiments, the search content received by the server of YOUTUBE is "comedy", so the search result issued from the server of YOUTUBE may include: a short video related to a comedy.

In an application scenario that the search content does not include the application information, in order to shorten user's information searching time, in some embodiments, the controller may cluster the search result issued from the homepage server, and then the clustered search result is displayed to a user through the display.

Figure 10:
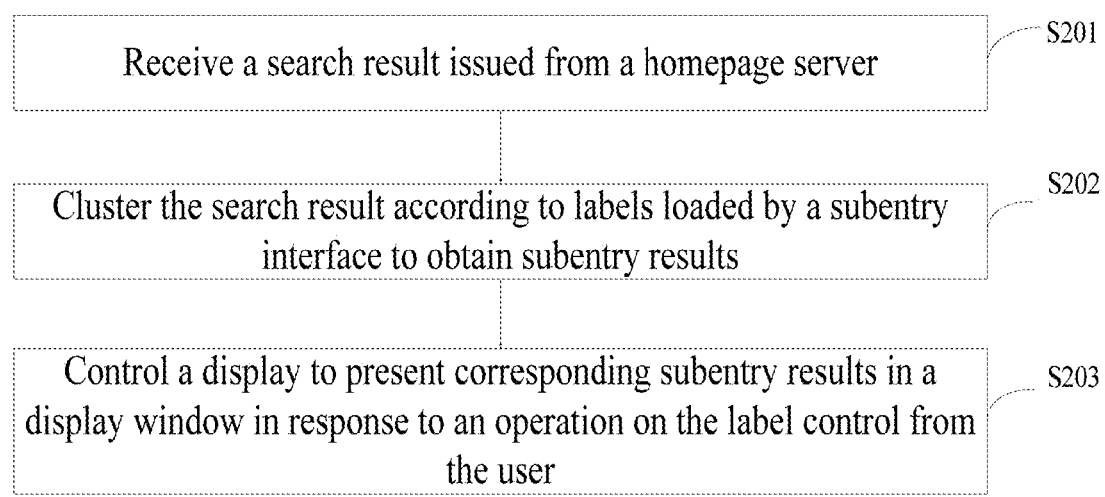
FIG. 10 is a flow chart of a clustering process for search results according to an embodiment of the disclosure.

In some embodiments, a clustering process for the search result may refer to FIG. 10, and FIG. 10 is a flow chart of the clustering process for the search result according to an embodiment of the disclosure. The controller is further configured to perform steps S201-S203.

S201 the search result issued from the homepage server is received.

S202 the search result is clustered according to labels loaded by a subentry interface to obtain subentry results.

In the actual application process, the labels loaded by the subentry interface may be configured as needed. For example, in some embodiments, the labels may include: an audio, a video and a web page. For example, in some embodiments, the labels may include: YOUTUBE, Wechat, Youku, Amazon and the like. Each of the labels corresponds to a label control.

Figure 11:
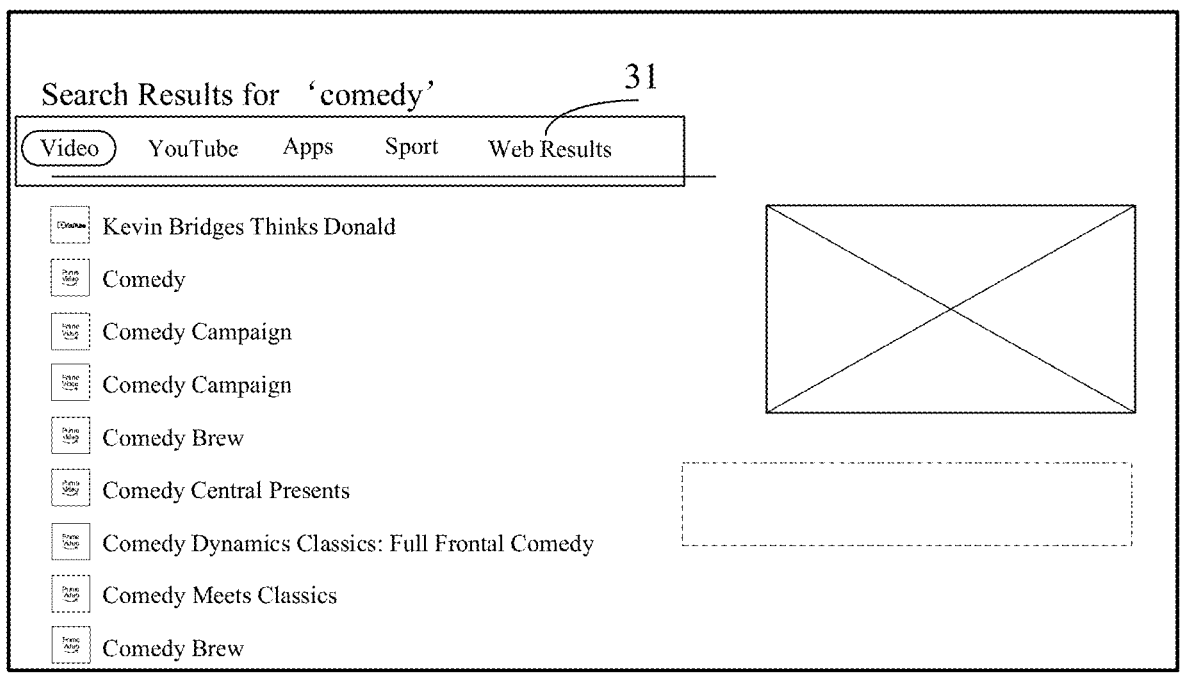
FIG. 11 is a schematic diagram of a subentry interface according to an embodiment of the disclosure.

FIG. 11 is a schematic diagram of the subentry interface according to an embodiment of the disclosure. It may be seen from the figure that the subentry interface totally has five label controls 31 which are respectively: a Video control, a YOUTUBE control, an APPS control, a SPORT control and a WebResult control.

S203 the display is controlled to present corresponding subentry results in a display window in response to an operation on the label control from a user.

For instance, taking the subentry interface shown in FIG. 11 as an example, the subentry interface totally has the five label controls which are respectively: the Video control, the YOUTUBE control, the APPS control, the SPORT control and the WebResult control. In response to the operation on the Video control from the user, the display presents a Video type search result which may refer to the display window 32 in FIG. 11.

In some embodiments, in response to an operation on an application label control from the user, an application corresponding to an application label is started; and a search content is transmitted to the application to cause the application to send a request carrying the search content to a server of the application.

The starting process of the application and the transmitting process of the search content may refer to embodiments above, which is not repeated here.

An operation flow of the display apparatus according to embodiments of the disclosure is described in detail below in combination with examples.

First embodiment is as follows.

Figure 9:
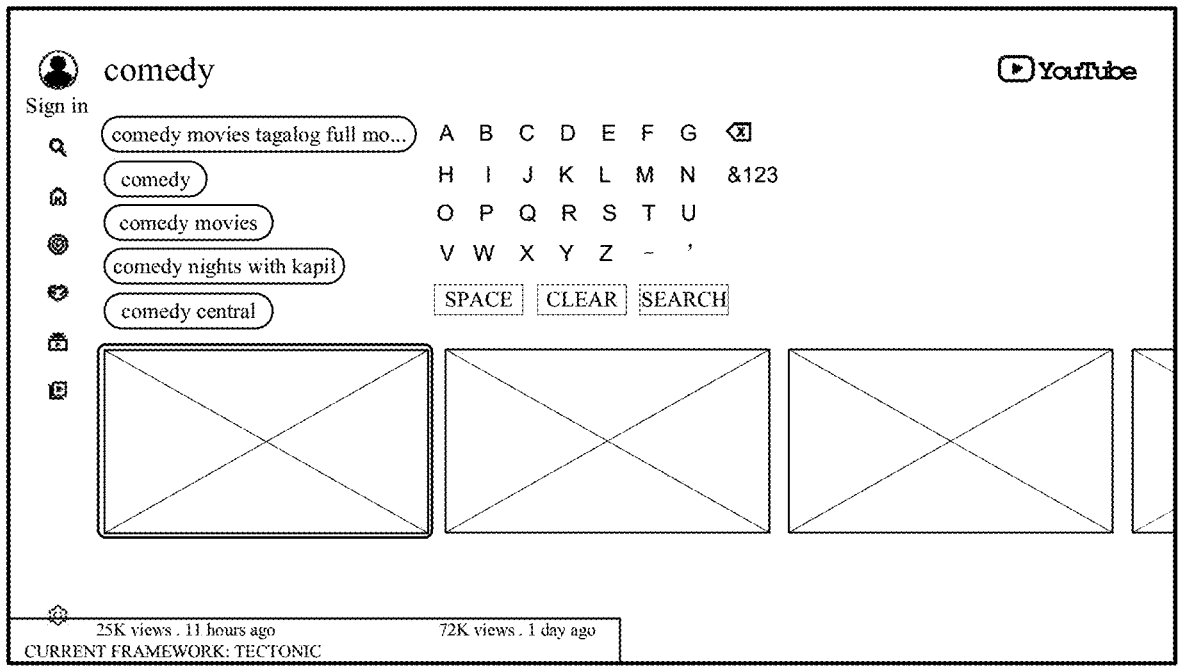
FIG. 9 is a schematic diagram of an application interface according to an embodiment of the disclosure.

At an initial state, a display presents a homepage, which may refer to FIG. 7, and a search control 11 may be set on the homepage. When a user needs searching, the user controls a focus to move through a remote control, and when the focus moves to the search control 11, the user touches the search control 11 through the remote control. In response to the operation on the search control 11 from the user, the homepage on the display jumps to a search interface, which may refer to FIG. 8. The search interface has a soft keyboard 22, and the user may input a search content in a way of controlling the focus to move through the remote control. In this embodiment, the search content input from the user is "comedy*YOUTUBE". The soft keyboard 22 has a confirmation control, and in response to an operation on the confirmation control from the user, a controller reads "comedy*YOUTUBE". The controller traverses an application list and screens out that an application name matching "comedy*YOUTUBE" is "YOUTUBE", and then the controller starts an application YOUTUBE and sends "comedy" to the application YOUTUBE. The application YOUTUBE sends "comedy" to a server of YOUTUBE. The server of YOUTUBE obtains a search result related to "comedy", and the search result only includes a short video related to a comedy. The server of YOUTUBE sends the short video related to "comedy" to the application YOUTUBE. The application YOUTUBE presents the short video related to "comedy" through the display. A final application interface may refer to FIG. 9. It may be seen from FIG. 9 that all search results presented by the display are short videos, and the user may play corresponding short videos according to own needs.

Second embodiment is as follows.

At an initial state, a display presents a homepage, which may refer to FIG. 7, and a search control 11 may be set on the homepage. When a user needs searching, the user controls a focus to move through a remote control, and when the focus moves to the search control 11, the user touches the search control 11 through the remote control. In response to the operation on the search control 11 from the user, the homepage on the display jumps to a search interface, which may refer to FIG. 8. The search interface has a soft keyboard 22, and the user may input a search content in a way of controlling the focus to move through the remote control. In this embodiment, the search content input from the user is "comedy". The soft keyboard 22 has a confirmation control, and in response to an operation on the confirmation control from the user, a controller reads "comedy". The controller traverses an application list and does not screen out that an application name matching "comedy". The controller sends "comedy" to a homepage application. A homepage server obtains a search result related to "comedy", and the search result only includes: a video related to a comedy, an audio related to a comedy, a picture related to a comedy, a website related to a comedy, a forum related to a comedy and so on. The controller presents the search result through the display. The user may select corresponding search results according to own needs.

Third embodiment is as follows.

At an initial state, a display presents a homepage, which may refer to FIG. 7, and a search control 11 may be set on the homepage. When a user needs searching, the user controls a focus to move through a remote control, and when the focus moves to the search control 11, the user touches the search control 11 through the remote control. In response to the operation on the search control 11 from the user, the homepage on the display jumps to a search interface, which may refer to FIG. 8. The search interface has a soft keyboard 22, and the user may input a search content in a way of controlling the focus to move through the remote control. In this embodiment, the search content input from the user is "comedy". The soft keyboard 22 has a confirmation control, and in response to an operation on the confirmation control from the user, a controller reads "comedy". The controller traverses an application list and does not screen out that an application name matching "comedy". The controller sends "comedy" to a homepage application. A homepage server obtains a search result related to "comedy", and the search result only includes: a video related to a comedy, an audio related to a comedy, a picture related to a comedy, a website related to a comedy, a forum related to a comedy and so on. In this embodiment, five set label controls are respectively: Video, YOUTUBE (short video), APPS, SPORT and WebResult, and correspondingly, the controller clusters search results into a Video type search result, a short video type search result, an APPS type search result, a SPORT type search result and a WebResult type search result. The controller controls the display to present a subentry interface, which may refer to FIG. 11. It may be seen from the figure that the subentry interface totally has five label controls which are respectively: a Video control, a YOUTUBE control, an APPS control, a SPORT control and a WebResult control. The display is controlled to present corresponding subentry results in a display window in response to an operation on the label control from the user. The user may select corresponding search results according to own requirements.

An embodiment of the disclosure provides a display apparatus, and the display apparatus at least includes a display and a controller. At an initial state, the display presents a homepage, and in response to a startup instruction, the homepage on the display jumps to a search interface. The search interface has a user interface, and the user interface is configured to receive a search content input from a user. In response to a search instruction, the controller reads the search content. If the search content includes a phrase for locating, the controller controls an application corresponding to the phrase for locating to be started so as to transmit the search content to the application to cause the application to send a request carrying the search content to a server of the application. The server of the application may obtain a search content related to the application. The display jumps to an application interface to present the search content issued from the server of the application, so that the user may obtain required search results more conveniently and quickly in the application interface. If the search content does not include a phrase for locating, the controller may send the search content to a homepage server, the homepage server may obtain search results related to the search content within the range of the whole network, and the display presents the search content issued from the homepage server.

Figure 12:
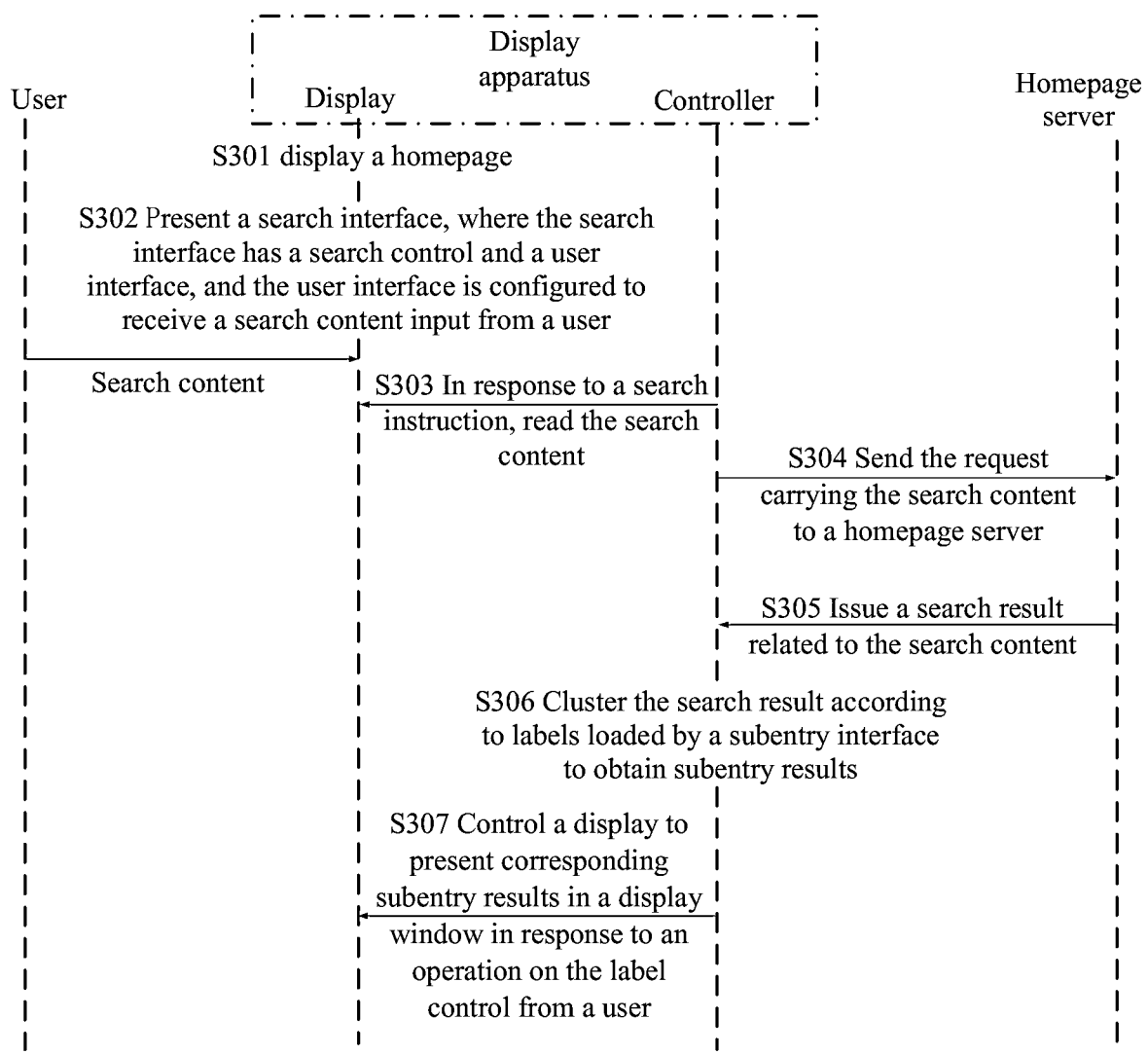
FIG. 12 is a flow chart of interaction of a display apparatus, a user and a server according to an embodiment of the disclosure.

Considering the above problems, a first aspect of an embodiment of the disclosure provides a display apparatus. The display apparatus includes a display, a user interface and a controller. An interaction process of the display apparatus, a user and a server may refer to FIG. 12. FIG. 12 is a flow chart of an interaction of the display apparatus, the user and the server according to an embodiment of the disclosure.

The display performs step S301 of displaying a homepage.

A display mode of the homepage may refer to embodiments above, which is not repeated here.

In response to a startup instruction, the display performs step S302 of presenting a search interface.

A generation mode of the startup instruction and a display mode of the search interface may refer to embodiments above, which is not repeated here.

S303: in response to a search instruction, a search content is read.

A controller performs step S304 of sending a request carrying the search content to a homepage server.

A sending mode of the request may refer to embodiments above, which is not repeated here.

The homepage server performs step S305 of issuing a search result related to the search content.

An issuing mode of the search result may refer to embodiments above, which is not repeated here.

The controller performs step S306 of clustering the search result according to labels loaded by a subentry interface to obtain subentry results.

A clustering process for the search result may refer to embodiments above, which is not repeated here.

The controller performs step S307 of controlling the display to present corresponding subentry results in a display window in response to an operation on a label control from the user.

A clustering process for the search result may refer to embodiments above, which is not repeated here.

In some embodiments, the controller is further configured to: in response to an operation on an application label control from the user, start an application corresponding to the application label control; and transmit the search content to the application to cause the application to send a request carrying the search content to a server of the application.

An embodiment of the disclosure provides a display apparatus, and the display apparatus at least includes a display and a controller. At an initial state, the display presents a homepage, and in response to a startup instruction, the homepage on the display jumps to a search interface. The search interface has a user interface, and the user interface is configured to receive a search content input from a user. In response to a search instruction, the controller reads the search content. The controller sends the search content to a homepage server, and the homepage server may obtain search results related to the search content within the range of the whole network. The controller receives the above search results and clusters the search results according to labels loaded by a subentry interface to obtain subentry results. The display is controlled to present the subentry interface. The subentry interface has a plurality of label controls, and each of the label controls is configured to load a label. The display is controlled to present corresponding subentry results in a display window in response to an operation on the label control from the user. The display apparatus according to an embodiment of the disclosure may cluster the search results issued from the homepage server and present a clustered result to the user, and thus the user may obtain required search results more conveniently and quickly in an application interface.

Second aspect is as follows.

With more and more functions of a display apparatus, there is a huge quantity of setting items. In related technologies, the setting items are presented in a tree-shaped structure. Hundreds of setting items are distributed to different categories, and hierarchical nesting is as deep as five levels. In addition, due to function indistinctness of certain setting items, categories to which the setting items are distributed are hard to distinguish. For a user not familiar with the setting items, the user needs to search each category continuously, bringing bad using experience to the user.

Figure 14:
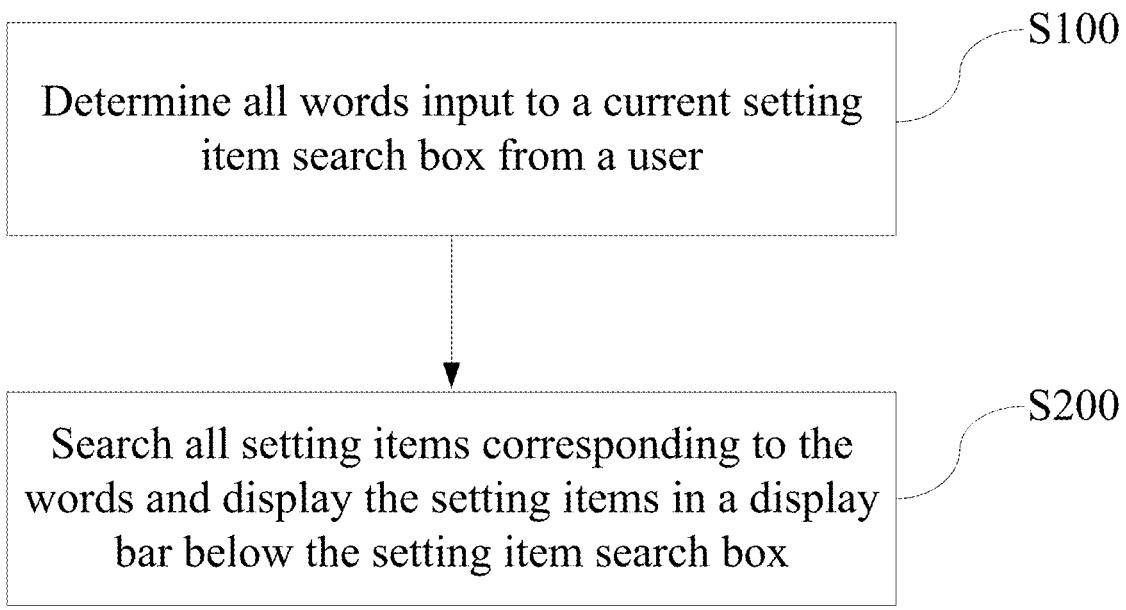
FIG. 14 shows a flow chart of a method of searching setting items according to some embodiments.

An embodiment of the disclosure provides a method of searching setting items as shown in FIG. 14. Through the method, the setting items may be searched, thereby improving the use feeling of the user.

Figure 13:
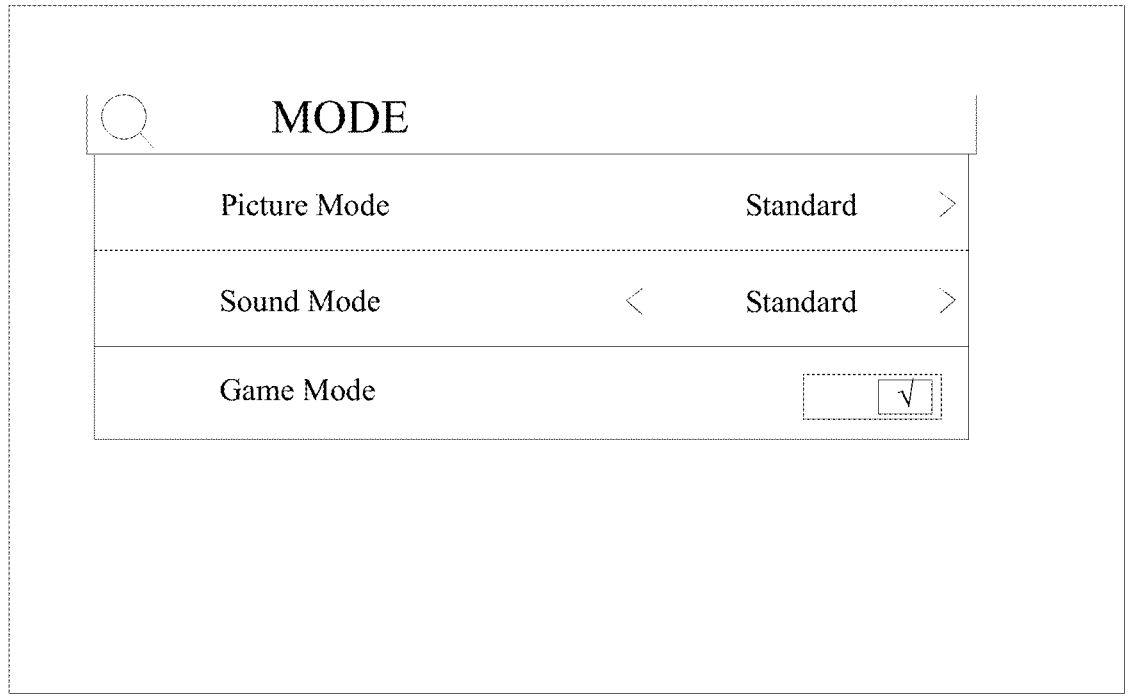
FIG. 13 shows a schematic diagram of a user interface according to some embodiments.

The method includes: S100, all words input to a current setting item search box from a user are determined. For example, as shown in FIG. 13, the user may input or delete letters in the setting item search box and may input letters M, O, D and E one by one. In an embodiment of the disclosure, the words may also be Chinese words or the like.

In some embodiments, as shown in S200, all setting items corresponding to the words are searched and displayed in a display bar below the setting item search box. In some embodiments, the setting items are stored in the form of a data tree, and nodes of the data tree include setting item nodes, sub-item nodes corresponding to the setting items and father nodes of the setting items. If the setting items in the data tree include words, the words are displayed in the display bar below the setting item search box.

In some embodiments, searching is performed in real time when all the setting items corresponding to the words are searched. For example, when the user input the letter M, all the setting items corresponding to the letter M are searched at this time and displayed in the display bar. The user continues to input the letter O behind the letter M, and all the setting items corresponding to the letters MO are searched at this time. When the user deletes the letter O in the letters MO from the setting item search box, all the setting items corresponding to the letter M are searched at this time. In some embodiments, when all the letters input to the current setting item search box from the user are MODE, a display interface is as shown in FIG. 13, and all the setting items corresponding to the letters MODE include a setting item Picture Mode, a setting item Sound Mode and a setting item Game Mode.

Due to time consuming of the search operation, during real-time searching, especially when letters are input or deleted frequently and quickly, real-time computing may occupy most computing resources of the display apparatus, resulting in lagging of the display apparatus and impacting the user experience. In some embodiments, prior to determining the letters input to the current setting item search box from the user, the method further includes: determining that a time interval between inputting or deleting letters in the setting item search box the last time and inputting or deleting letters in the setting item search box this time is not smaller than a preset time interval.

It should be noted that in order to prevent letters from being frequently input or deleted in the setting item search box maliciously, in an embodiment of the disclosure, prior to determining the letters input to the current setting item search box from the user, the time interval between inputting or deleting letters in the setting item search box the last time and inputting or deleting letters in the setting item search box this time as well as the preset time interval are determined first. In some embodiments, the preset time interval is 200 ms.

When the time interval between inputting or deleting letters in the setting item search box the last time and inputting or deleting letters in the setting item search box this time is smaller than or equal to the preset time interval, it shows that the situation of inputting or deleting the letters frequently exists, and therefore, in an embodiment of the disclosure, the letters input or deleted under the situation are neglected, and the step of determining the letters input to the current setting item search box from the user is not performed. When the time interval between inputting or deleting letters in the setting item search box the last time and inputting or deleting letters in the setting item search box this time is not smaller than the preset time interval, the step of determining the letters input to the current setting item search box from the user is performed, and the time of inputting or deleting letters in the setting item search box this time is used as a basis for calculating a time interval with inputting or deleting letters in the setting item search box next time.

In some embodiments, the time interval between inputting or deleting letters in the setting item search box the last time and inputting or deleting letters in the setting item search box this time is determined first, and if the time interval is greater than the preset time interval, the nodes of the data tree are obtained. If the nodes are the father nodes, the nodes are not the setting items, and if the nodes are not the father nodes, whether the nodes are the setting item nodes is determined, and whether the nodes include all the letters in the current setting item search box is determined. If the nodes are the setting item nodes and include all the letters in the current setting item search box, the setting items are displayed in the display bar.

In order to make the user select sub-items corresponding to the setting items conveniently, in an embodiment of the disclosure, the corresponding sub-items may be selected from the setting items displayed in the display bar.

In some embodiments, a presentation mode of the setting items includes a jumping mode, a selecting mode and a converting mode.

In some embodiments, a controller is further configured to perform: receiving a first operation input from a user interface and indicating displaying of all sub-items corresponding to the setting items of the jumping mode. The sub-items are displayed on a display according to the first operation.

For example, as shown in FIG. 13, the first operation may be completed in a way that the user operates a control apparatus to move a selector to a "right arrow" corresponding to the setting item Picture Mode and presses a confirmation key. Afterwards, a user interface jumps, and a user interface after jumping displays all sub-items corresponding to the setting item Picture Mode. The sub-items include standard and the like. The user may select a proper sub-item on the user interface displaying all the sub-items.

It should be further noted that the selector is configured to indicate that any item is selected, such as a focus object. The display apparatus may be controlled to display moving of the focus object to select or control the items according to input of the user from the control apparatus. For example, the user may select and control the items by controlling moving of the focus object between the items through a direction key on the control apparatus.

Identification forms of the selector are generally diversified. For example, a position of the focus object is marked through the selector by changing a frame line, a size, a color, transparency and a contour and/or a font of a text or image of a focused item and the like, and the position of the focus object may further be implemented or marked by amplifying the item or setting a background color of the item.

In some embodiments, the setting items of the jumping mode further display sub-items used at present. For example, the setting item Picture Mode in the user interface in FIG. 13 displays a sub-item standard used at present.

In some embodiments, the controller is further configured to perform: receiving a second operation input from the user interface and indicating adjustment of sub-items corresponding to the setting items of the selecting mode; and displaying another sub-item adjacent to a currently displayed sub-item on the display according to the second operation.

For example, as shown in FIG. 13, the second operation may be completed in a way that the user operates the control apparatus to move the selector to a "left arrow" or "right arrow" corresponding to the setting item Picture Mode and presses the confirmation key. The sub-items corresponding to the setting item Sound Mode include theatre, standard, music, speech, late night, sport and auto. When the selector is located on the "right arrow" and the user presses the confirmation key, the sub-item standard displayed in the setting item Sound Mode is replaced with the sub-item music. In some embodiments, the "left arrow" or "right arrow" corresponding to the setting item Sound Mode does not exist forever, when the currently displayed sub-item is the last one in a sub-item list corresponding to the setting item Sound Mode, the "right arrow" is not displayed, and when the currently displayed sub-item is the first one in the sub-item list corresponding to the setting item Sound Mode, the "left arrow" is not displayed.

In some embodiments, the controller is further configured to perform: receiving a third operation input from the user interface and indicating turning on or off of the setting items of the converting mode; and controlling the display to display a state corresponding to the setting items according to the third operation.

For example, as shown in FIG. 13, the third operation may be completed in a way that the user operates the control apparatus to move the selector to a "switch" corresponding to the setting item Game Mode and presses the confirmation key. If the state of the currently displayed setting item Game Mode is turned-on, the state is changed to turned-off when the confirmation key is pressed. If the state of the currently displayed setting item Game Mode is turned-off, the state of the currently displayed setting item Game Mode is changed to turned-on when the confirmation key is pressed.

In some embodiments, if the setting item of the converting mode cannot be turned on through the state of the setting item, an error prompt is popped up from the interface when the user presses the confirmation key.

In some embodiments, the controller is configured to perform displaying the setting items in the display bar below the setting item search box according to following steps: sorting all found setting items corresponding to the words; and displaying the sorted setting items in the display bar.

In an embodiment of the disclosure, since the found setting items are different in importance, the setting items are sorted, and the setting items which are most possibly selected by the user are arranged in front. In some embodiments, since there are too many found setting items, a preset quantity of setting items may be displayed in the display bar in an embodiment of the disclosure.

In some embodiments, the controller is configured to perform sorting all the found setting items corresponding to the words according to following steps: determining the latest using time of the setting items and the number of times of using the setting items in a history; and sorting all the found setting items corresponding to the words according to the latest using time and the number of times of using.

In some embodiments, the sorting all the found setting items corresponding to the words according to the latest using time and the number of times of using, includes following steps.

Current time is determined, and a difference value between the latest using time of the setting items and the current time is calculated and compared with a preset duration. For example, the current time is 15:58:02 in Sep. 26, 2020, the latest using time of a setting item A is 15:58:01 in Sep. 26, 2020, a time difference of the current time and the latest using time of the setting item A is calculated and 1000 ms is obtained. The preset duration is 1 ms, the time difference is greater than or equal to the preset duration, and thus a final time difference is determined to be 1000 ms. The latest using time of a setting item B is 15:58:02 in Sep. 26, 2020, a time difference of the current time and the latest using time of the setting item B is calculated and 0 ms is obtained. The preset duration is 1 ms, the time difference is smaller than the preset duration, and thus a final time difference is determined to be a preset time difference. In some embodiments, the preset time difference is 1.

The number of times of using the setting items is determined. When the number of times of using the setting items is greater than 1, the final number of times of using is the actual number of times of using. For example, the number of times of using a setting item A is 30, then the final number of times of using is 30. When the number of times of using the setting items is not greater than 1, the final number of times of using is the preset number of times of using. For example, the number of times of using a setting item B is 0, then the final number of times of using is 1. In some embodiments, the preset number of times of using is 1.

Ranks of the setting items are determined according to the final time difference and the final number of times of using.

In some embodiments, the larger the final time difference, the longer the latest using time of the corresponding setting items from the current time. The larger the final number of times of using, the larger the number of times of setting the corresponding setting items by the user.

In some embodiments, the step that the ranks of the setting items are determined according to the final time difference and the final number of times of using, includes: a weight is calculated through a formula according to the final time difference; the weight=(2*24*60*60*1000)/final time difference; and it should be noted that if the final time difference is greater than two days, the corresponding setting items have little significance.

In some embodiments, when the weight is smaller than 1, a final weight is determined to be 1, and when the weight is not smaller than 1, the final weight is determined to be a real weight.

The final weight multiplies the final number of times of using to obtain a rank score, and the corresponding setting items are arranged in the display bar according to the rank scores from high to low.

In embodiments above, the method of searching the setting items and the display apparatus improve the use feeling of the user. The method includes: all the words input to the current setting item search box from the user are determined; and all the setting items corresponding to the words are searched and displayed in the display bar below the setting item search box.

Third aspect is as follows.

In some application scenarios, a display apparatus has a built-in search application which is generally a default search application in a homepage. In addition, a third party search application may further be installed in the display apparatus, such as Google, Baidu, Youtube and Amazon. The built-in search application of the display apparatus has a very large retrieve range which may involve media resource data of a plurality of third party platforms, and thus search results generally presented to a user by the built-in search application are a media resource set of the plurality of third party search applications.

Figure 15:
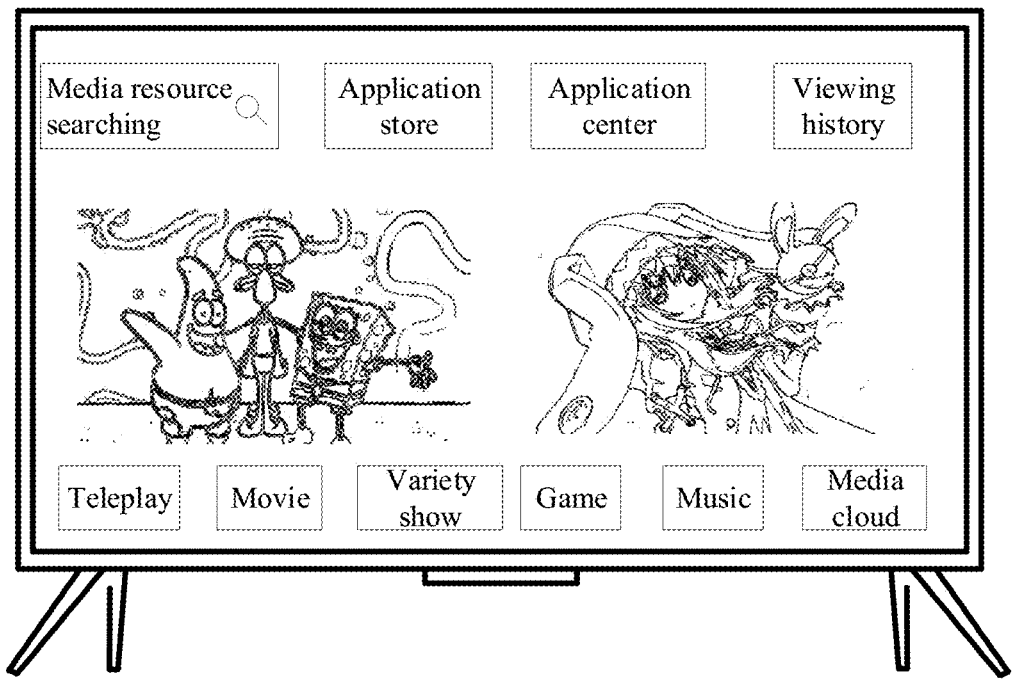
FIG. 15 shows a schematic diagram of a homepage in a display apparatus.

In some embodiments, the display apparatus generally has the homepage, and entrances of some resources, operations and applications are provided in the homepage. FIG. 15 shows a homepage of the display apparatus 200, where the upper portion of the homepage includes media resource searching, an application store, an application center, a viewing history and other modules. Some recommended videos may be displayed in the middle of the homepage, such as the hottest and newest videos, and these videos are pushed to a user so that the user may conveniently and quickly play possible interested videos. The lower portion of the homepage may include some subject modules, such as teleplays, movies, variety shows, games, music and media cloud.

Figure 16:
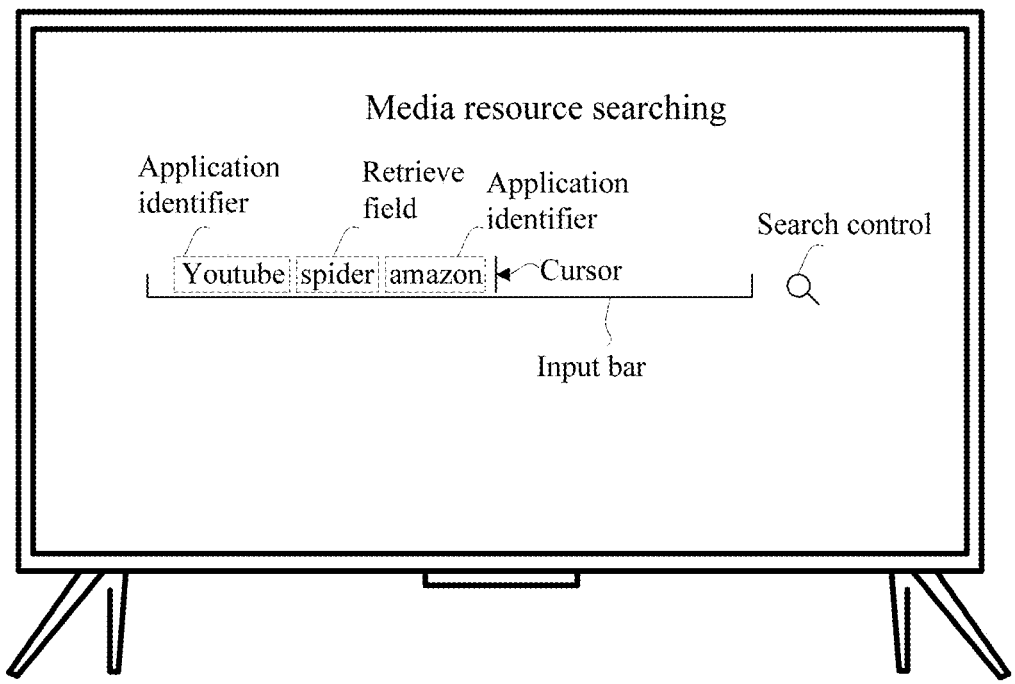
FIG. 16 shows a schematic diagram of a search page.

In an application scenario, if a user clicks on "media resource searching" when browsing the homepage, the built-in search application of the display apparatus is started, the display apparatus jumps to a search page shown in FIG. 16, and the search page includes an input bar and a search control. The user clicks on the input bar to make a cursor blink in the input bar, so the user may start to input keyword information. After the keyword information is input, the user clicks on the search control to start a media resource searching flow of the display apparatus.

In some embodiments, the user may operate an electronic keyboard through input devices such as a remote control 100 and a mouse to input the keyword information, or input the keyword information through a physical keyboard, or, the keyword information input from the user in a voice form is collected through a sound collector 231. An input mode of the keyword information is not limited. The keyword information input from the user may be synchronously displayed on the input bar, and the cursor may move with continuous input of letters.

The keyword information may be input by using different language input methods to adapt to using environments of different countries and languages. In an example of the search page in FIG. 16, the keyword information is "Youtube spider amazon", the language is English, each word in the keyword information may be in the form of capitalization or lowercase, and when a plurality of key words need to be input, the adjacent words may be separated by entering spaces. The keyword information includes three words which are "Youtube", "spider" and "amazon" respectively. "Youtube" and "amazon" are obviously English names of third party applications, thus may be recognized as application identifiers, the application identifiers may be full names, short names or other preset representation forms of the search applications, and the application identifiers have global uniqueness, that is, the search applications and their application identifiers correspond one to one. In the keyword information input from the user, a search term is necessary, the search term is configured to screen and search correspondingly matching media resource data, and in FIG. 16, the word "spider" or media resource data related to the word are obtained. When the keyword information is recognized, all included words may be distinguished according to separation of space words, then application identifiers in all the words are recognized, and other words are recognized as search terms.

In some embodiments, the keyword information may include one or more application identifiers. When one application identifier is included, the search application corresponding to the application identifier is an independent target search application, so the target search application is directly controlled to retrieve the media resource data. For example, the keyword information is "Christmas Google", then "Google" is recognized as the only included application identifier, "Christmas" is a search term, and thus the page jumps to the application Google to retrieve media resource data matching Christmas.

Figure 17:
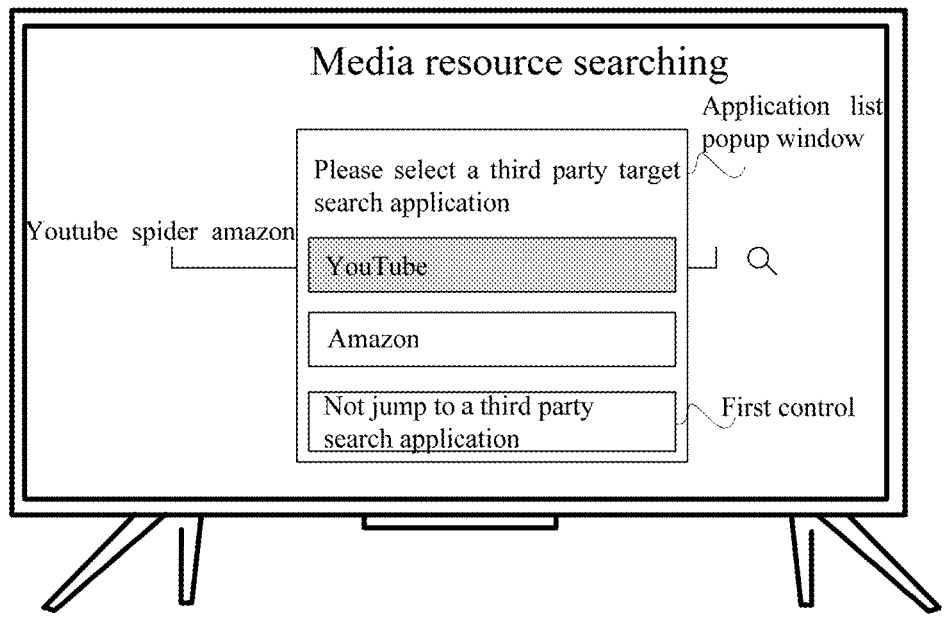
FIG. 17 shows a schematic diagram of an application list popup window.

In some embodiments, when the keyword information includes a plurality of application identifiers, it shows that two or more search applications are involved to retrieve the media resource data. In order to improve search efficiency, one of the search applications may be preferred as the target search application. Taking an example that the keyword information is "Youtube spider amazon", FIG. 17 shows an example that an application list popup window is displayed on the upper layer of the search page, operation guidance information is displayed on the upper portion of the application list popup window, such as "please select a third party target search application", and after seeing the operation guidance information, a user may select one of the application identifiers listed below as the target search application. The plurality of application identifiers included in the keyword information and the first control may be sequentially presented below the operation guidance information, the first row in FIG. 17 shows the application identifier "Youtube", the second row shows the application identifier "Amazon", the third row shows the first control, and the first control may be, for example, shown in the form of "not jump to a third party search application".

If the user clicks on "Youtube" or "Amazon", it shows that the page needs to jump to the third party search application to retrieve the media resource data, so the application identifier selected by the user becomes a target application identifier, the application corresponding to the target application identifier is the target search application, and thus the page jumps to the target search application to retrieve and display the media resource data.

Figure 18:
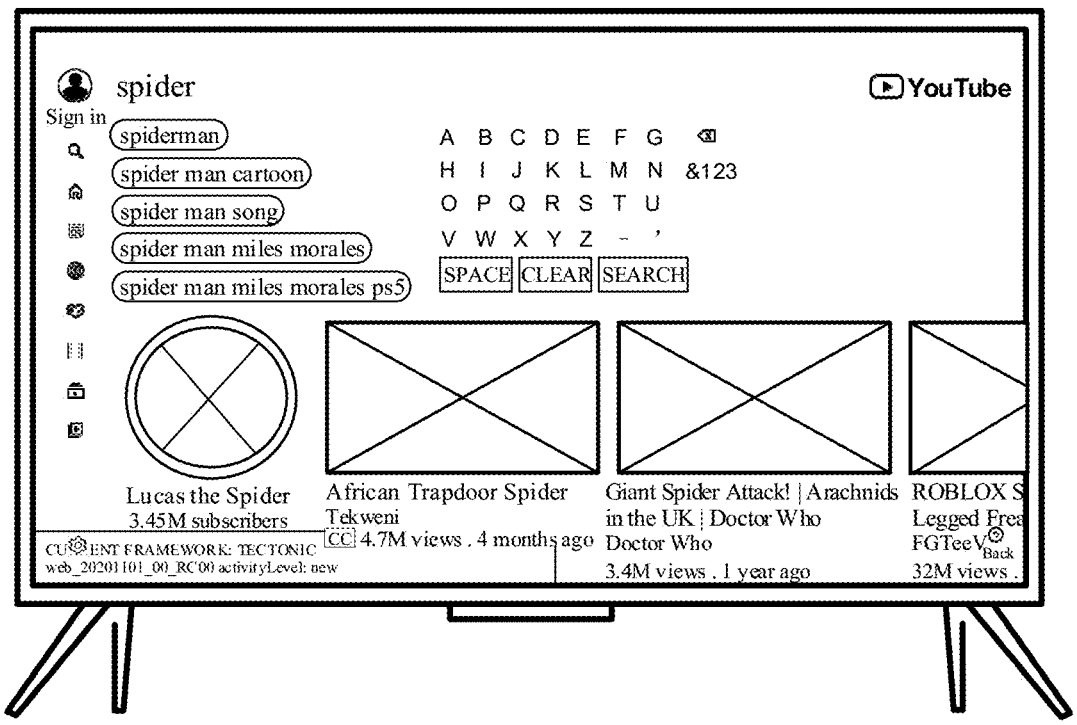
FIG. 18 shows a schematic diagram of an interface that a target search application retrieves and presents media resource data.

In some embodiments, as shown in FIG. 18, the user selects "Youtube" in the application list popup window, so the application YouTube becomes the target search application, after the page jumps to the application YouTube, the application YouTube presents the retrieved media resource data in the application interface according to the search term "spider". The media resource data are video resources related to forms such as "spider", "SPIDER" or "Spider", that is, keywords carried in the found media resource data may be allowed to have differences with the search term in capital or small letter of the words. For example, each piece of the media resource data is presented on the lower portion of an interface in FIG. 18, the user may switch the media resource data through a left key or a right key, and when a certain piece of media resource data obtains a focus, the user clicks a confirmation key to jump the page to play media resource videos. The media resource data presented in the interface for the user to check may include a thumbnail, a video name, a video size, issuing time and other contents, which are not limited in the disclosure. The third party target search application may further include an electronic keyboard, the electronic keyboard supports input of words such as letters, numbers and symbols, so the user may conveniently operate the electronic keyboard to modify the search term at any time to change the media resource data.

In some embodiments, when the user inputs words to an input bar on the upper left corner in FIG. 18, some search terms similar to the currently input words/character strings may be pushed below the input bar. For example, when "spider" is input, "spiderman", "spider man cartoon", "spider man song" and other search terms are pushed below. If the pushed search terms include a target expected to be input by the user, the pushed search term may be directly clicked on without inputting a complete search term in the input bar, and thus search efficiency and user experience are improved.

Figure 19:
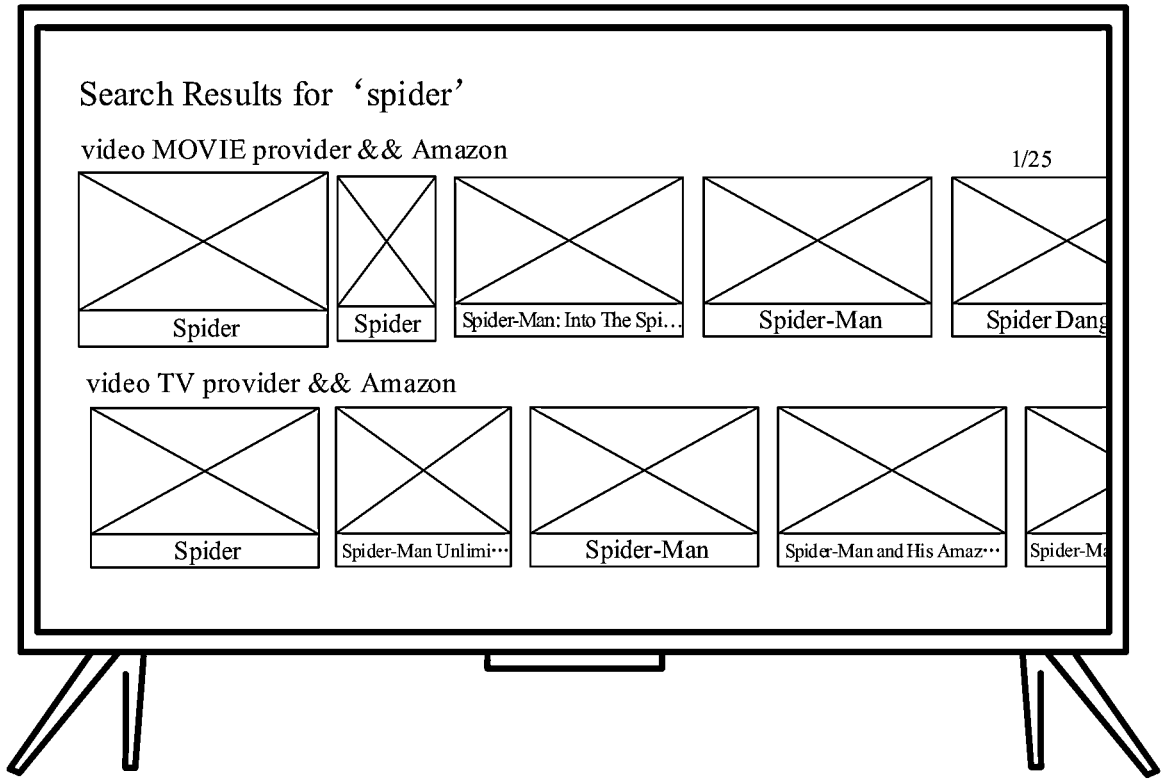
FIG. 19 shows a schematic diagram of a built-in search application presenting a media resource set.

In some embodiments, if the user clicks on the first control, it shows that the user does not want to use the third party search application to search the media resource data, then a conventional search flow is performed to control the built-in search application of the display apparatus to perform retrieving by using the keyword information, so a media resource set of the plurality of search applications is obtained, and the media resource set is displayed in the page of the built-in search application. As shown in FIG. 19, search results of the built-in search application when the search term is "spider" are presented (Search Results for 'spider'), and the built-in search application may present the search results in a classified mode, for example, a first type presents media resource data of a movie type related to "spider", and search sources of this type of media resource data are marked, such as video MOVIE provider && Amazon, which shows that spider movie media resources come from Amazon; and a second type presents media resource data of a TV type related to "spider", and search sources of this type of media resource data are marked, such as video TV provider && Amazon, which shows that spider TV media resources come from Amazon. Alternatively, media resource sets may be mixed to be presented; or, classified presentation is performed according to the third party search applications, for example, the spider media resource data from Amazon are collected to one module region to be presented, the spider media resource data from YouTube are collected to another module region to be presented, and so on. It should be noted that after the media resource sets are obtained, the built-in search application may present various media resource data according to different forms or categories, which are not limited to this embodiment and the example in FIG. 19.

In some embodiments, after the user clicks on the target application identifier or first control in the application list popup window, the application list popup window is automatically hidden, and the page jumps to a page corresponding to the search result.

In some embodiments, when the user inputs the keyword information in the page of FIG. 16, if the user does not want to specify a specific third party search application, the user may not input the application identifier, so the keyword information only includes the search term and excludes any application identifier. In this case, the conventional search flow is performed to control the built-in search application of the display apparatus to perform retrieving by using the keyword information, so a media resource set of the plurality of search applications is obtained, and the media resource set is displayed in the page of the built-in search application. This embodiment is similar to the search flow and page displaying adopted when the first control is triggered as aforementioned, which is not repeated here.

The UI figures provided by the disclosure are only exemplary, and on the basis of a search mechanism of the disclosure, UI presentation, jumping and change may be adaptively set, which is based on actual applications.

Under the conventional search flow, the media resource set including the media resource data of the plurality of third party search applications may be retrieved according to the search term input from the user, and thus the media resource set includes a great data size. The page for presenting the search results may only present a limited data size, on the one hand, more and even complete media resource data may not be presented to the user, and on the other hand, due to the great data size, the user takes a long time to search desired media resources, and the efficiency is low, so that the search function of the display apparatus cannot provide better use experience for the user.

Figure 20:
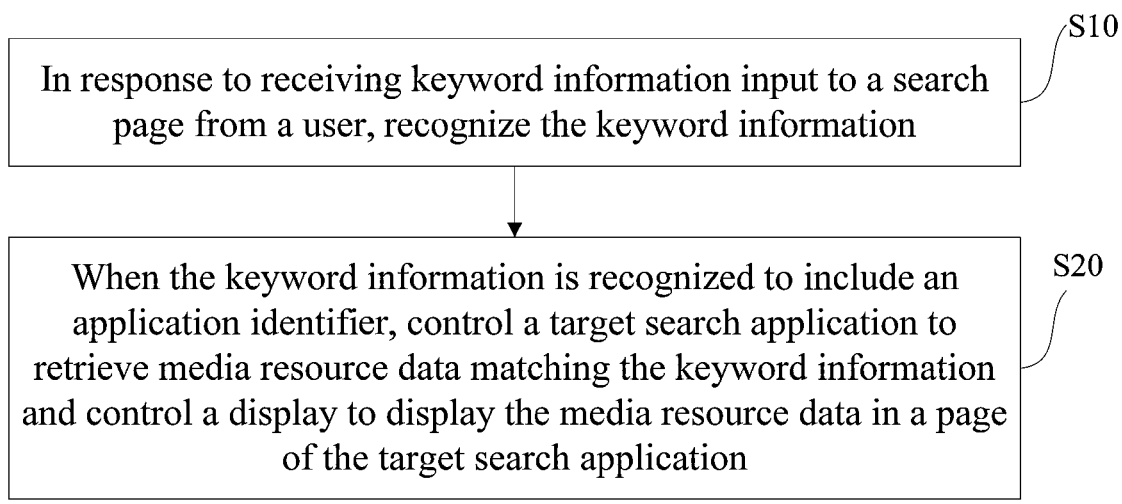
FIG. 20 shows a flow chart of a search method.

Based on this, in some embodiments, as shown in FIG. 20, a search method is provided. The method is configured to be performed by the controller 250 in the display apparatus, that is, the controller 250 is an executing subject of the method. The method includes following steps.

Step S10, in response to receiving keyword information input to a search page from a user, the keyword information is recognized.

Herein, recognizing the keyword information is mainly recognizing application identifiers and search terms included therein, locating and jumping of third party search applications are performed by using the application identifiers, and matching media resource data are searched by using the search terms.

In some embodiments implementing step S10, if space characters are recognized in the keyword information, the keyword information is divided into a plurality of keywords by using the space characters. For example, the keyword information is "NBA Kobe google", two space characters may be recognized in the information, and then the information is divided into three keywords which are respectively "NBA", "Kobe" and "google". The keywords in the keyword information are in a relation of "logic AND", that is, finally found media resource data should match all the keywords. Then each keyword matches an application identifier pool, the application identifier pool stores application identifiers of third party applications that are installed in the display apparatus and support a search function, the application identifiers may be full names, short names, abbreviations or other preset identification forms of the applications, and application identifiers of different languages may also be stored to improve recognition accuracy. If the identifications are English identifications, both capital and small letters may be recognized, for example, Google/google/GOOGLE corresponds to the same third party search application.

For each keyword, if the keyword is included in the application identifier pool, the keyword belongs to application identifier, such as "google". If the keyword is not included in the application identifier pool, it is determined that the keyword belongs to a search term, and the search term is configured to screen and match the media resource data during retrieving, for example, "NBA" and "Kobe" are search terms recognized from the aforementioned keyword information.

In some embodiments, the application identifier pool may be updated according to using states of the third party search applications. For example, when a certain third party search application is unloaded, the application identifier of the third party search application is deleted from the pool; or, if a third party search application is newly added in the display apparatus, after the third party search application is successfully installed, the application identifier of the third party search application is stored in the pool, so that the application identifier pool is dynamically updated to guarantee accuracy of recognition of the application identifiers in the keyword information and avoid mistaken recognition and missing recognition.

In some embodiments, when the keyword information is recognized for search matching, different matching modes may further be set according to matching degree requirements, such as accurate matching and fuzzy matching. Through accurate matching, space characters and capital and small letters of each word may be strictly matched with high precision, found media resource data are more accurate, but the filtering degree is high and the data size may be relatively small. Through fuzzy matching, the space characters and the capital and small letters of each word are not matched, found media resource data are relatively low in matching degree, but the filtering degree is low and the data size for browsing is relatively large. A user may select accurate matching or fuzzy matching according to requirements on the matching degree/data size of the media resource data.

Step S20, when the keyword information is recognized to include an application identifier, the target search application is controlled to retrieve the media resource data matching the keyword information and a display is controlled to display the media resource data in the page of the target search application. Step S20 corresponds to the situation that the application identifiers are recognized in the keyword information, and step S20 may include three situations (A) to (C) below.

Situation (A): the keyword information is recognized to include only one application identifier, the target search application corresponding to the application identifier is directly controlled to retrieve the media resource data, and the media resource data found according to the search term in the page of the target search application is presented to the user to browse.

Situation (B): the keyword information is recognized to include a plurality of application identifiers, that is, when more than one application identifier is recognized, the display 275 is controlled to display the application list popup window, as shown in FIG. 17, the application list popup window may present names of all the recognized third party search applications and the first control, each name corresponds to one third party search application, and the conventional search flow is performed when the first control is triggered instead of jumping to the third party search application to retrieve the media source data. In response to receiving a selection operation on the target application identifier in the application list popup window, the controller 250 controls the target search application corresponding to the target application identifier to retrieve the media resource data, that is, one of the plurality of recognized third party search applications is selected as the target search application, thereby improving targeting, efficiency and accuracy of media resource searching.

Situation (C): the keyword information is recognized to include a plurality of application identifiers, the display 275 is controlled to display the application list popup window, and after the user sees the application list popup window, if the user does not want to jump to the third party search application to search the media resources, the user may click on the first control in the popup window. In response to receiving a click operation on the first control, the controller 250 performs the conventional search flow and controls the built-in search application to perform retrieving according to the keyword information, so a media resource set of the plurality of search applications is obtained, and the display 275 is controlled to display the obtained media resource set in the page of the built-in search application. For example, the keyword information is "Youtube spider amazon", two application identifiers "Youtube" and "amazon" are included therein, the search term is "spider", and thus the media resource set includes all media resource data related to spiders in Youtube and amazon. The media resource set is presented to the user in the page (referring to FIG. 19) of the built-in search application, so that the user may conveniently browse and search desired media resources. All the media resource data in the media resource set may be gathered for presentation, or classified for presentation according to the application identifiers, and displaying of the media resource set and the UI are not limited in this embodiment.

In some embodiments, the user possibly only inputs a search term and does not input any application identifier, which corresponds to the situation that no application identifier is recognized in the keyword information, similar to the situation (C), the built-in search application needs to be controlled to perform retrieving according the keyword information to obtain a media resource set of a plurality of search applications, and the display 275 is controlled to display the obtained media resource set in the page of the built-in search application. Different from the situation (C), since the keyword information does not include any application identifier, a search result includes a larger data size, the media resource set may include the media resource data, matching the search term, of all the third party search applications in the application identifier pool, and relatively speaking, although more comprehensive media resources obtained by traversing all third party platforms may be provided for the user, the efficiency of searching desired media resources of the user is low.

Figure 21:
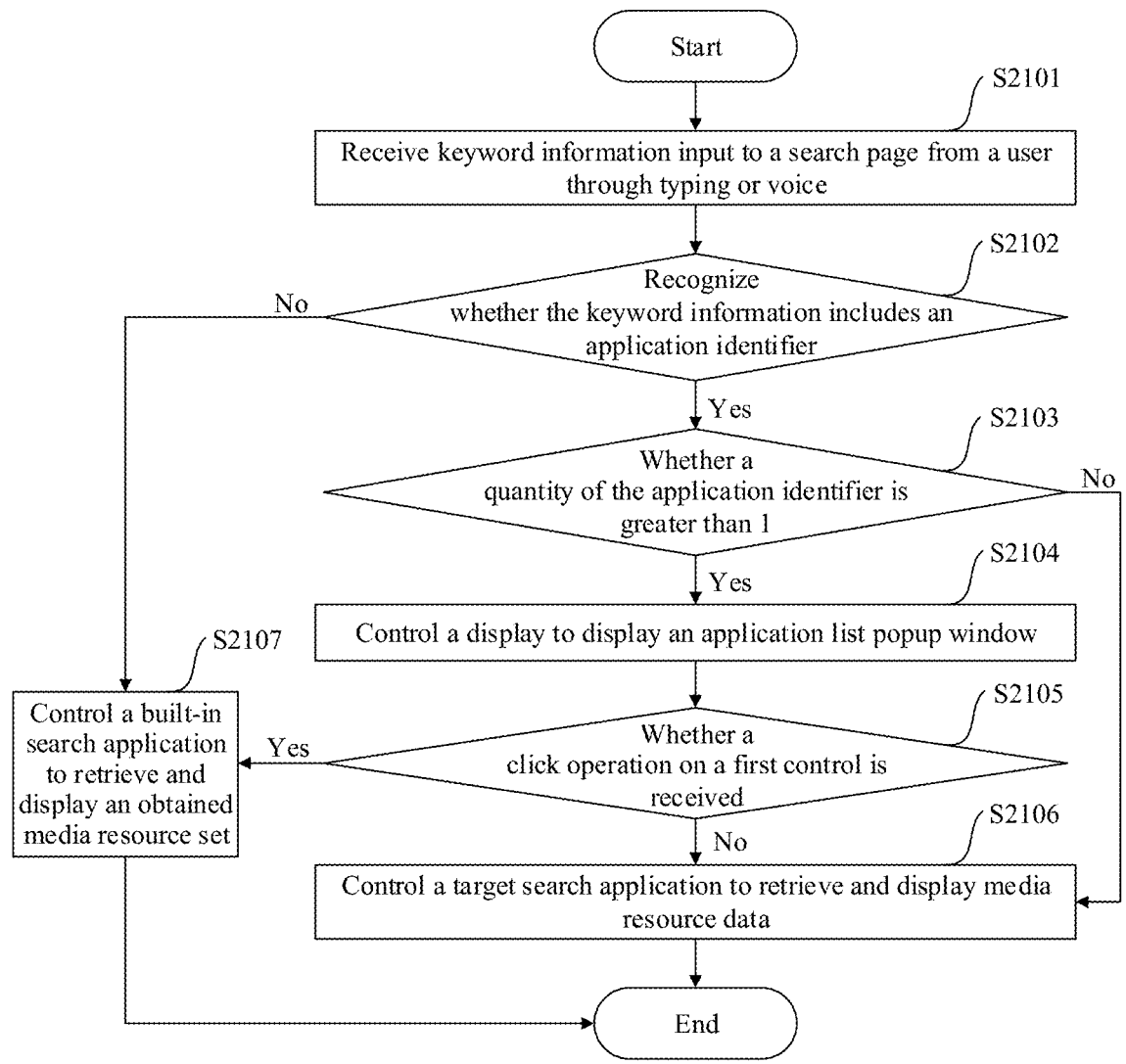
FIG. 21 shows a flow chart of a search method according to another embodiment.

As shown in FIG. 21, an embodiment of another search method is provided, and the method includes the following steps.

Step S2101, keyword information input to a search page from a user through typing or voice is received.

Step S2102, whether the keyword information includes an application identifier is recognized; and if the keyword information includes an application identifier, step S2103 is performed, if the keyword information does not include an application identifier, step S2107 is performed.

Step S2103, whether a quantity of the application identifier is greater than 1 is determined; and if the quantity of the application identifier is greater than 1, step S2104 is performed, if the quantity of the application identifier is not greater than 1, step S2106 is performed.

Step S2104, a display is controlled to display an application list popup window.

Step S2105, whether a click operation on a first control is received is determined; if the click operation on the first control is not received, it shows that the user clicks on one of target application identifiers, and step S2106 is performed; if the click operation on the first control is received, that is, the user clicks on the first control, step S2107 is performed.

Step S2106, a target search application is controlled to retrieve and display media resource data.

Step S2107, a built-in search application is controlled to retrieve and display an obtained media resource set.

It may be known from the above scheme that the user may input the keyword information to the search page, the keyword information may include the search terms and the application identifiers, the search terms are configured to screen matching media resource data, and the application identifiers are configured to point the target search applications where the media resource data are from. Then the controller recognizes the keyword information and performs the corresponding search flows according to whether the keyword information includes the application identifiers and the quantity of the application identifiers. Once it is recognized that the keyword information includes the application identifier, the target search application may be started to retrieve the media resource data, the search results are displayed in the page of the target search application, and thus media resource searching has higher targeting of platforms. By the scheme, a great quantity of non-matching media resource data may be filtered out, the matching media resource data in the third party search application specified by the user are quickly found, and thus the efficiency of searching the desired media resources of the user and the accuracy of the search function are improved, thereby improving user experience.

The disclosure further provides a computer-readable non-transitory storage medium, where the storage medium may store a program, and the program, when executed, may include part or all of the steps in embodiments of the methods provided by the disclosure. The storage medium may be a magnetic disc, an optical disc, a read-only memory (ROM) or a random access memory (RAM), etc.

Finally, it should be noted that: above embodiments are only used to illustrate the scheme of the disclosure, not to limit the disclosure; although the disclosure has been described in detail with reference to above embodiments, those ordinarily skilled in the art should understand that: they may still modify the scheme recorded in above embodiments or make equivalent replacement for some or all of the technical features; and these modifications or replacements do not separate the essence of the corresponding scheme from the scope of the scheme of embodiments of the disclosure.

What is claimed is:

1. A display apparatus, comprising:
a display configured to present an image from a broadcast system or network and/or a user interface;
a communicator configured to communicate with one or more servers via the network; and
a remote control comprising one or more buttons and configured for control of the display;
a controller, comprising a plurality of applications for providing video content and configured to perform:
controlling the display to present a homepage and to change from the homepage to a search interface in response to a startup instruction, wherein the search interface includes a user interface and a search control;
receiving a search content from a user through the user interface, and reading the search content;
determining whether the search content upfront-contains a phrase for locating an application among the plurality of applications;
in response to the search content upfront-containing a phrase for locating a first application among the plurality of applications, activating the first application indicated by the phrase for locating; and transmitting the search content to the first application to cause the first application to send a request carrying the search content to a server of the first application; and
in response to the search content not comprising a phrase for locating any application among the plurality of applications, sending a request carrying the search content to a server of the homepage that provides entrances for media resources, operations, and applications, wherein the server of the homepage is different from the server of the first application.

2. The display apparatus according to claim 1, wherein the display is further configured to display a subentry interface, the subentry interface has a display window and at least one label control, and each label control of the at least one label control is configured to load a label; and
the controller is further configured to:
in response to the search content not comprising the phrase for locating, receive a search result issued from the homepage server;
cluster the search result according to labels loaded by the subentry interface to obtain subentry results; and
control the display to present corresponding subentry results in the display window in response to an operation on the label control from the user.

3. The display apparatus according to claim 2, wherein the controller is further configured to:
in response to an operation on an application label control from the user, start an application corresponding to the application label control; and
transmit the search content to the application to cause the application to send a request carrying the search content to a server of the application.

4. The display apparatus according to claim 1, wherein the controller is further configured to:
in response to the search content upfront-containing the phrase for locating the first application, divide the search content into a phrase for search and the phrase for locating; and
transmit the phrase for search to the first application.

5. The display apparatus according to claim 1, wherein the controller is further configured to:

traverse an application list stored in advance, wherein the application list is configured to record application names of the plurality of applications installed in the display apparatus; and
in response to the application list comprising an application name matching the search content, start an application corresponding to the application name in the application list as the first application.

6. The display apparatus according to claim 5, wherein the application list is configured to record short names of the plurality of applications installed in the display apparatus.

7. The display apparatus according to claim 5, wherein the controller is further configured to:
calculate similarities between the search content and the application names or short names recorded in the application list;
select a maximum similarity; and
start an application corresponding to an application name or short name with the maximum similarity as the first application in response to the maximum similarity being greater than a preset similarity.

8. The display apparatus according to claim 6, wherein the controller is further configured to:
calculate similarities between the search content and the application names or short names recorded in the application list;
select a maximum similarity; and
start an application corresponding to an application name or short name with the maximum similarity as the first application in response to the maximum similarity being greater than a preset similarity.

9. The display apparatus according to claim 1, wherein a presentation region of the homepage is configured to present icons of the plurality of applications installed in the display apparatus.

10. The display apparatus according to claim 1, wherein a presentation region of the homepage is configured to present application names of the plurality of applications installed in the display apparatus; or a presentation region of the homepage is configured to present icons of the plurality of applications and application names of the plurality of applications installed in the display apparatus.

11. A method for a display apparatus, comprising:
controlling a display of the display apparatus to present a homepage and to change from the homepage to a search interface in response to a startup instruction, wherein the search interface includes a user interface and a search control;
receiving a search content from a user through the user interface and reading the search content;
determining whether the search content upfront-contains a phrase for locating an application among the plurality of applications;
in response to the search content upfront-containing a phrase for locating a first application among the plurality of applications, activating the first application indicated by the phrase for locating; and transmitting the search content to the first application to cause the first application to send a request carrying the search content to a server of the first application; and
in response to the search content not comprising a phrase for locating any application among the plurality of applications, sending a request carrying the search content to a server of the homepage that provides entrances for media resources, operations, and applications, wherein the server of the homepage is different from the server of the first application.

12. The method according to claim 11, wherein the display is further configured to display a subentry interface, the subentry interface has a display window and at least one label control, and each label control of the at least one label control is configured to load a label;
and in response to the search content not comprising the phrase for locating, the method further comprises:
in response to the search content not comprising the phrase for locating, receiving a search result issued from the homepage server;
obtaining subentry results by clustering the search result according to labels loaded by the subentry interface; and
controlling the display to present corresponding subentry results in the display window in response to an operation on the label control from the user.

13. The method according to claim 12, further comprising:
in response to an operation on an application label control from the user, starting an application corresponding to the application label control; and
transmitting the search content to the application to cause the application to send a request carrying the search content to a server of the application.

14. The method according to claim 11, further comprising:
in response to the search content upfront-containing the phrase for locating the first application, dividing the search content into a phrase for search and the phrase for locating; and
transmitting the phrase for search to the first application.

15. The method according to claim 11, further comprising:
traversing an application list stored in advance, wherein the application list is configured to record application names of the plurality of applications installed in the display apparatus; and
in response to the application list comprising an application name matching the search content, starting an application corresponding to the application name in the application list as the first application.

16. The method according to claim 15, wherein the application list is configured to record short names of the plurality of applications installed in the display apparatus.

17. The method according to claim 15, further comprising:
calculating similarities between the search content and the application names or short names recorded in the application list
selecting a maximum similarity; and
starting an application corresponding to an application name or short name with the maximum similarity as the first application in response to the maximum similarity being greater than a preset similarity.

18. The method according to claim 16, further comprising:
calculating similarities between the search content and the application names or short names recorded in the application list
selecting a maximum similarity; and
starting an application corresponding to an application name or short name with the maximum similarity as the first application in response to the maximum similarity being greater than a preset similarity.

19. The method according to claim 11, wherein a presentation region of a homepage is configured to present icons of the plurality of applications installed in the display apparatus.

20. The method according to claim 11, wherein a presentation region of the homepage is configured to present application names of the plurality of applications installed in the display apparatus; or a presentation region of the homepage is configured to present icons of the plurality of applications and application names of the plurality of applications installed in the display apparatus.

* * * * *